(12) United States Patent
Marcel

(10) Patent No.: US 12,132,358 B2
(45) Date of Patent: Oct. 29, 2024

(54) APPARATUS FOR FACILITATING PROPULSION OF A VEHICLE

(71) Applicant: Airborne Motorworks Inc., The Woodlands, TX (US)

(72) Inventor: Jesse Antoine Marcel, Veradale, WA (US)

(73) Assignee: Airborne Motorworks Inc., The Woodlands, TX (US)

( * ) Notice: Subject to any disclaimer, the term of this patent is extended or adjusted under 35 U.S.C. 154(b) by 137 days.

(21) Appl. No.: 17/963,271

(22) Filed: Oct. 11, 2022

(65) Prior Publication Data

US 2023/0113569 A1     Apr. 13, 2023

Related U.S. Application Data

(60) Provisional application No. 63/254,233, filed on Oct. 11, 2021.

(51) Int. Cl.
*H02K 11/21* (2016.01)
*B60F 5/02* (2006.01)
(Continued)

(52) U.S. Cl.
CPC .............. *H02K 11/21* (2016.01); *B60F 5/02* (2013.01); *B64C 29/0025* (2013.01); *B64C 37/00* (2013.01); *B64D 27/34* (2024.01); *H02K 1/16* (2013.01); *H02K 7/14* (2013.01); *H02K 11/30* (2016.01); *H02K 11/33* (2016.01); *H02K 16/02* (2013.01); *B64C 11/001* (2013.01); *B64C 11/02* (2013.01); *B64C 11/14* (2013.01); *B64C 23/02* (2013.01); *B64C 27/14* (2013.01); *B64C 27/20* (2013.01); *B64C 27/24* (2013.01); *B64C 29/0016* (2013.01); *B64C 29/0058* (2013.01); *B64C 29/0083* (2013.01); *B64C 2203/00* (2013.01); *B64D 35/021* (2024.01); *B64D 35/04* (2013.01); *B64D 35/08* (2013.01)

(58) Field of Classification Search
CPC combination set(s) only.
See application file for complete search history.

(56) References Cited

U.S. PATENT DOCUMENTS 9,815,552 B1 * 11/2017 Welsh ..................... B64C 29/02
2004/0094662 A1 * 5/2004 Sanders, Jr. ............ B64C 27/20
                                                                    244/12.5

(Continued)

*Primary Examiner* — Binh Q Tran
(74) *Attorney, Agent, or Firm* — Lowe Graham Jones PLLC

(57) ABSTRACT

An apparatus for facilitating propulsion of a vehicle. The apparatus comprises a housing with an interior space, an inlet, and an outlet, a propulsion mechanism, and a gimbal. The propulsion mechanism is disposed in the interior space and comprises and an upper rotor and a lower rotor rotatably mounted on a first portion and a second portion of a spindle. The upper rotor rotates in a first direction and the lower rotor rotates in a second direction opposite to the first direction. Upper rotor blades have a first blade pitch and lower rotor blades have a second blade pitch opposite to the first blade pitch. The rotating of the upper rotor and the lower rotor creates a fluid flow from the inlet to the outlet for generating a directional thrust. The gimbal rotatably attaches the propulsion mechanism to the housing. The housing is rotatable for vectoring the directional thrust.

20 Claims, 33 Drawing Sheets

(51) Int. Cl.

| | |
|---|---|
| *B64C 11/00* | (2006.01) |
| *B64C 11/02* | (2006.01) |
| *B64C 11/14* | (2006.01) |
| *B64C 23/02* | (2006.01) |
| *B64C 27/14* | (2006.01) |
| *B64C 27/20* | (2023.01) |
| *B64C 27/24* | (2006.01) |
| *B64C 29/00* | (2006.01) |
| *B64C 37/00* | (2006.01) |
| *B64D 27/34* | (2024.01) |
| *B64D 35/021* | (2024.01) |
| *B64D 35/04* | (2006.01) |
| *B64D 35/08* | (2006.01) |
| *H02K 1/16* | (2006.01) |
| *H02K 7/14* | (2006.01) |
| *H02K 11/30* | (2016.01) |
| *H02K 11/33* | (2016.01) |
| *H02K 16/02* | (2006.01) |

(56) References Cited

U.S. PATENT DOCUMENTS

| | | | |
|---|---|---|---|
| 2006/0016929 A1* | 1/2006 | Mohr | B64C 29/0025 |
| | | | 310/112 |
| 2014/0158816 A1* | 6/2014 | DeLorean | B64C 39/12 |
| | | | 244/12.4 |
| 2017/0073070 A1* | 3/2017 | Xing | B64D 7/00 |
| 2018/0370623 A1* | 12/2018 | Globerman | B64U 30/24 |
| 2019/0256191 A1* | 8/2019 | Suzuki | B64C 17/00 |
| 2021/0403155 A1* | 12/2021 | Neiser | B64C 29/0033 |

* cited by examiner

APPARATUS FOR FACILITATING PROPULSION OF A VEHICLE

CROSS-REFERENCE TO RELATED APPLICATION

This application claims the benefit of U.S. Provisional Patent Application No. 63/254,233, titled "REFLEXIVE INERTIA PROPULSION POWERED PERSONAL AIR VEHICLE", filed on 11 Oct. 2021, which is incorporated by reference herein in its entirety.

FIELD OF THE INVENTION

Generally, the present disclosure relates to the field of transportation. More specifically, the present disclosure relates to an apparatus for facilitating propulsion of a vehicle.

BACKGROUND OF THE INVENTION

The field of propulsion is technologically important to several industries, business organizations, and/or individuals. Existing air vehicles are not compact and not as easy to drive as road-going vehicles. Furthermore, existing air vehicles do not provide safety measures for ensuring the safety of the driver. Furthermore, existing air vehicles severely limit the utility of flying cars as well as creating enough power to lift and fly the vehicles with occupants and batteries, when using electrical motors. Furthermore, the propulsion system of the existing air vehicles is not powerful, efficient, safe, and capable of stabilizing the vehicle. As a result, a different propulsion system is needed which is powerful, efficient, safe, and capable of stabilizing the vehicle.

Therefore, there is a need for improved apparatus for facilitating propulsion of a vehicle that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is an apparatus for facilitating propulsion of a vehicle, in accordance with some embodiments. Accordingly, the apparatus may include a housing, a propulsion mechanism, and a gimbal. Further, the housing may include an interior space, an inlet, and an outlet. Further, the propulsion mechanism may be disposed in the interior space. Further, the propulsion mechanism may include a hub and a spindle rotatably mounted within the hub. Further, a first portion of the spindle extends away from a top side of the hub and a second portion of the spindle extends away from a bottom side of the hub. Further, the propulsion mechanism may include an upper rotor rotatably mounted on the first portion and a lower rotor rotatably mounted on the second portion. Further, the upper rotor may be configured to be rotated about a central axis of the spindle in a first direction using an upper stator and the lower rotor may be configured to be rotated about the central axis of the spindle in a second direction opposite to the first direction using a lower stator. Further, the upper rotor may include a plurality of upper rotor blades with a first blade pitch and the lower rotor may include a plurality of lower rotor blades with a second blade pitch opposite to the first blade pitch. Further, the rotating of the upper rotor in the first direction and the lower rotor in the second direction creates a fluid flow from the inlet to the outlet for generating a directional thrust. Further, the generating of the directional thrust facilitates the propulsion of the vehicle. Further, the gimbal may be disposed in the interior space. Further, the gimbal may be configured for rotatably attaching the propulsion mechanism to the housing. Further, the housing may be rotatable in relation to the propulsion mechanism for vectoring the directional thrust based on the rotatably attaching. Further, the generating of the directional thrust and the vectoring of the directional thrust facilitates at least one propelling action associated with the propulsion of the vehicle.

Further disclosed herein is a vehicle with apparatuses for propulsion of the vehicle, in accordance with some embodiments. Accordingly, the vehicle may include a vehicle body and at least one apparatus. Further, the vehicle body may be defining a vehicle fuselage. Further, the at least one apparatus may be installed in the vehicle. Further, the installing of the at least one apparatus to the vehicle may include connecting the at least one apparatus to the vehicle body. Further, each of the at least one apparatus may include a housing, a propulsion mechanism, and a gimbal. Further, the housing may include an interior space, an inlet, and an outlet. Further, the propulsion mechanism may be disposed in the interior space. Further, the propulsion mechanism may include a hub and a spindle rotatably mounted within the hub. Further, a first portion of the spindle extends away from a top side of the hub and a second portion of the spindle extends away from a bottom side of the hub. Further, the propulsion mechanism may include an upper rotor rotatably mounted on the first portion and a lower rotor rotatably mounted on the second portion. Further, the upper rotor may be configured to be rotated about a central axis of the spindle in a first direction using an upper stator and the lower rotor may be configured to be rotated about the central axis of the spindle in a second direction opposite to the first direction using a lower stator. Further, the upper rotor may include a plurality of upper rotor blades with a first blade pitch and the lower rotor may include a plurality of lower rotor blades with a second blade pitch opposite to the first blade pitch. Further, the rotating of the upper rotor in the first direction and the lower rotor in the second direction creates a fluid flow from the inlet to the outlet for generating a directional thrust. Further, the generating of the directional thrust facilitates the propulsion of the vehicle. Further, the gimbal may be disposed in the interior space. Further, the gimbal may be configured for rotatably attaching the propulsion mechanism to the housing. Further, the housing may be rotatable in relation to the propulsion mechanism for vectoring the directional thrust based on the rotatably attaching. Further, the generating of the directional thrust and the vectoring of the directional thrust facilitates at least one propelling action associated with the propulsion of the vehicle.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
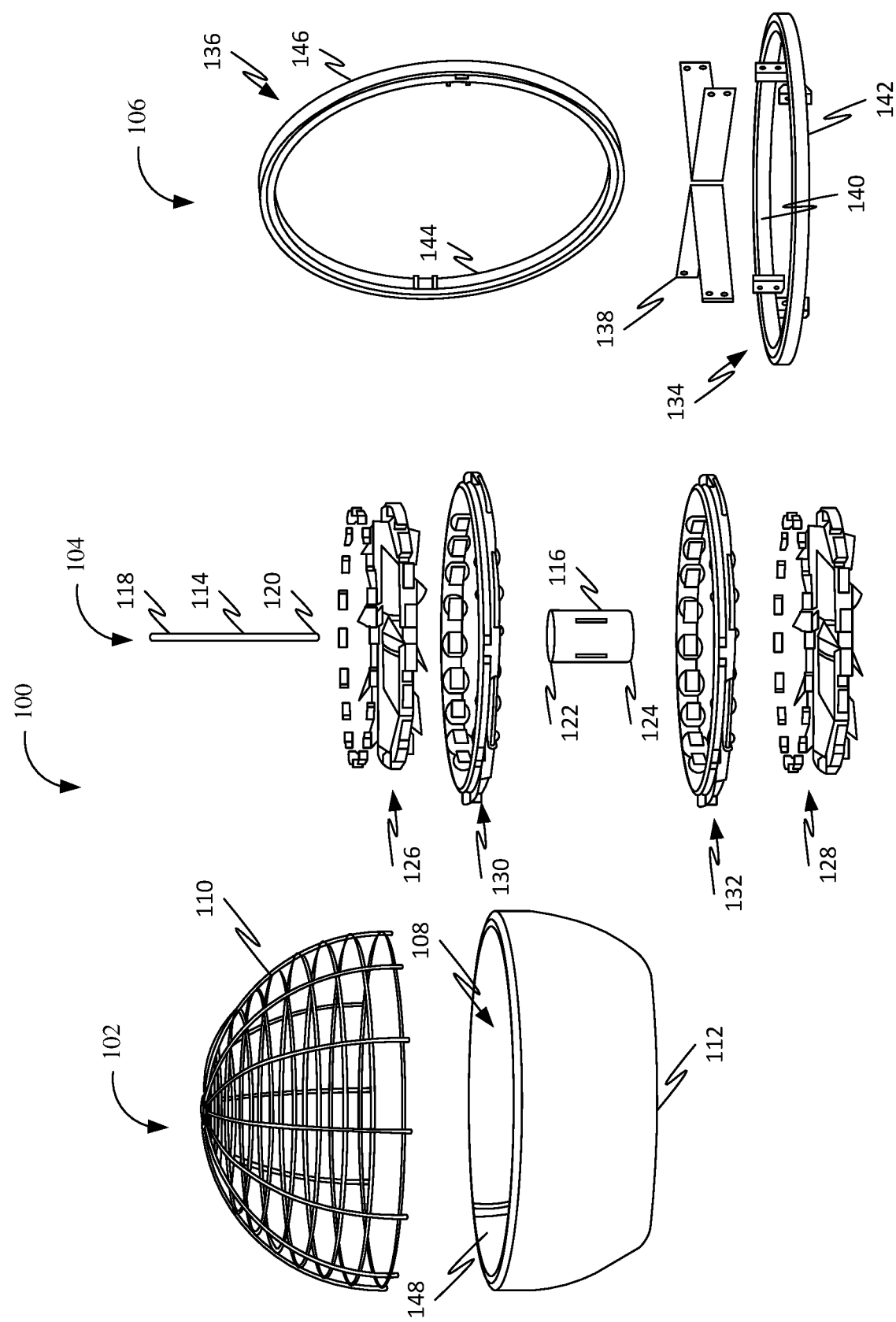
FIG. 1 is a disassembled view of an apparatus for facilitating propulsion of a vehicle, in accordance with some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of an apparatus for facilitating propulsion of a vehicle, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the processing device may be the computing device. Further, the server computer may include a communication device configured for communicating with one or more external devices. The communication device may be the computing device. The one or more external devices may include, for example, but are not limited to, a client device, a third party database, a public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. Further, the storage device may be the computing device. In general, the storage device may be configured for providing reliable storage of digital information. Accordingly, in some embodiments, the storage device may be based on technologies such as but not limited to, data compression, data backup, data redundancy, deduplication, error correction, data finger-printing, role based access control, and so on.

Further, one or more steps of the method disclosed herein may be initiated, maintained, controlled, and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal, or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer, etc.) and/or possession of a machine readable secret data (e.g. encryption key, decryption key, bar codes, etc.) and/or or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera, and so on. Likewise, the one or more steps may include receiving, using the communication device, the one or more embodied characteristics from one or more biometric sensors.

Further, one or more steps of the method may be automatically initiated, maintained, and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device, etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor, etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the computing device may include at least one processing unit and a system memory. Depending on the configuration and type of computing device, system memory may comprise, but is not limited to, volatile (e.g. random-access memory (RAM)), non-volatile (e.g. read-only memory (ROM)), flash memory, or any combination. System memory may include operating system, one or more programming modules, and may include a program data. Operating system, for example, may be suitable for controlling computing device operation. In one embodiment, programming modules may include image-processing module, machine learning module. Furthermore, embodiments of the disclosure may be practiced in conjunction with a graphics library, other operating systems, or any other application program and is not limited to any particular application or system.

Computing device may have additional features or functionality. For example, computing device may also include additional data storage devices (removable and/or non-removable) such as, for example, magnetic disks, optical disks, or tape. Such additional storage is a removable storage and a non-removable storage. Computer storage media may include volatile and non-volatile, removable and non-removable media implemented in any method or technology for storage of information, such as computer-readable instructions, data structures, program modules, or other data. System memory, removable storage, and non-removable storage are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device. Any such computer storage media may be part of device. Computing device may also have input device(s) such as a keyboard, a mouse, a pen, a sound input device, a touch input device, a location sensor, a camera, a biometric sensor, etc. Output device(s) such as a display, speakers, a printer, etc. may also be included. The aforementioned devices are examples and others may be used.

Computing device may also contain a communication connection that may allow device to communicate with other computing devices, such as over a network in a distributed computing environment, for example, an intranet or the Internet. Communication connection is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory, including operating system. While executing on processing unit, programming modules (e.g., application such as a media player) may perform processes including, for example, one or more stages of methods, algorithms, systems, applications, servers, databases as described above. The aforementioned process is an example, and processing unit may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Overview

The present disclosure describes an apparatus for facilitating propulsion of a vehicle.

Further, the present disclosure describes a reflexive inertia propulsion-powered personal air vehicle (PAV). Further, the PAV may include four novel corners mounted reflexive inertia propulsion systems (or propulsion systems or the apparatus) that provide the thrust necessary for vertical takeoff, hovering, and directional thrust for horizontal control. Further, the propulsion system may include rotors in the form of gyroscopic flywheels (or flywheels) that counter-rotate to create thrust where the flywheel spokes have an airfoil cross-section. Further, a rim or shroud of the flywheel may include integrated magnets and is used to replace the permanent magnets of an in-runner style brushless motor. Further, the PAV may include a hemispherical guard that protects the PAV surroundings and constitutes the upper part of an outer shell. The propulsion systems are further protected by physical barriers or bumpers rigidly mounted to the PAV's bodywork. Further, the reflexive propulsion system may include two counter-rotating flywheel/rotors (upper flywheel and lower flywheel), each with opposite pitch, and each with integrated magnetic rings. Further, the PAV may include a cross member for locating a fixed hub containing the spindle within the motor casing. Further, the motor casing includes two stators (upper stator and lower stator) with field coils that force the two rotor rings to rotate in opposite directions. Further, the counter-rotating rotors may eliminate the rotational torque of the central rotor assembly. Further, the motor casing is rigidly mounted inside an inner duct housing. Further, the reflexive propulsion system may include a gimbal that may include a horizontal roller/thrust bearing and a vertical roller/thrust bearing. Further, the reflexive propulsion system may include a lower sphere attached to the outer ring of the horizontal roller/thrust bearing as well as the outer ring of the vertical roller bearing. Further, the reflexive propulsion system may include a flexible nozzle connecting the lower inner duct housing with the exit of a lower hemisphere in its polar location. Further, the reflexive propulsion system may include an upper shield/guard hemisphere rigidly mounted to the lower hemisphere to protect the immediate surroundings of the reflexive propulsion system. Further, the PAV may include a central computer utilizing a fly-by-wires system that controls the speed of the flywheel/motors and servomechanisms that actuate the rotatable reflexive shell. The central computer, including avionics, allows for autonomous control of the vehicle.

Further, the present disclosure describes a personal air vehicle powered by multi-spherical reflexive inertia propulsion systems. Further, the personal air vehicle may include a fuselage having a longitudinal axis configured for accommodating at least one passenger and a cockpit. Further, the fuselage may include an outer structure that may include an internal space associated with the at least one passenger and the cockpit. Further, the cockpit may include a flight computer configured for facilitating controlling flight of the personal air vehicle using a fly-by-wire system. Further, the cockpit may include a vehicle steering mechanism configured for steering the personal air vehicle. Further, the personal air vehicle may include a plurality of reflexive inertia propulsion mechanisms fixedly attached to the fuselage. Further, the plurality of reflexive inertia propulsion mechanisms may be configured for generating thrust for facilitating take-off and landing of the personal air vehicle. Further, each reflexive inertia propulsion mechanism of the plurality of reflexive inertia propulsion mechanisms may include two counter-rotating flywheels integrated with magnetic rings, a motor case housing comprises two stators with field coils that force the magnetic rings of each of the two counter-rotating flywheels to rotate in opposite directions, a gimbal comprising a horizontal thrust bearing and a vertical thrust bearing, a lower sphere attached to an outer ring of the horizontal thrust bearing and an outer ring of the vertical thrust bearing, a flexible nozzle connecting a lower inner duct housing with a lower hemisphere, and an upper shield hemisphere rigidly mounted to the lower hemisphere to protect from the immediate surrounding of the plurality of reflexive propulsion mechanisms. Further, the personal air vehicle may include a peripheral propulsion mechanism attached to the fuselage. Further, the peripheral propulsion mechanism may be configured for facilitating directional control of the personal air vehicle. Further, the personal air vehicle may include a power source configured for powering at least one of the peripheral propulsion mechanisms, the plurality of reflexive inertia propulsion mechanisms, and the flight computer.

The present disclosure describes a reflexive inertia propulsion-powered personal air vehicle (PAV). The disclosed vehicle may be designed to accept four novel corners mounted reflexive inertia propulsion systems (or propulsion systems) that provide the thrust necessary for vertical take-off, hovering, and directional thrust for horizontal control. The design of the vehicle with the reflexive inertia propulsion creates a compact, easy to drive, and stable vehicle with utility that is unobtainable with current technology. Several issues have existed that have kept the idea of a flying car/PAV off of the movie screen and into the real world. The disclosed vehicle may be compact and as easy to drive as a road-going vehicle, with numerous safety measures. Further, the propulsion system may produce the required power for flight without infringing on the utility necessary to meet the expectations for a PAV/flying car.

Some conventional attempts to create a flying car/PAV have been met with little success due to attempts to use current propulsion, for an example motors with propellers, that severely limits utility as well as creating enough power to lift and fly the vehicles with occupant and batteries, when using electrical motors. Flying cars/PAVs for the moment have turned into electrified helicopters and airplanes with limited success while the idea of a flying car keeps slipping further away.

The disclosed vehicle may cure the problems facing the reality of a flying car/PAV with a propulsion system that is powerful, efficient, safe, and capable of stabilizing the vehicle. The disclosed vehicle may be designed to take full advantage of the propulsion in meeting the goals of being compact, safe, and easy to drive. Further, the propulsion system may produce thrust using rotors in the form of gyroscopic flywheels that counter-rotate to create thrust, wherein the flywheel spokes have an airfoil cross-section. Further, a rim or shroud of the gyroscope has integrated magnets and is used to replace the permanent magnets of an in-runner style brushless motor. By locating the magnets in the rim of the flywheel rather than at its center like a conventional motor, leveraged torque may be created allowing for steeper and taller blades/spokes to create thrust in a smaller diameter. Further, a stator portion of an in-runner motor (or the in-runner style brushless motor) integrates the stator windings in a ducted fan housing. Further, the weight of the magnets and the rims of the gyroscopes when rotated create gyroscopic inertia. Further, a gyroscope motor may be mounted within a gimbal that allows the gyroscope motor to maintain a vertical orientation regardless of the orientation of the vehicle to the horizon. To effect directional change, an outer shell connected to the outside of the gimbal directs thrust through a penetration in its polar location, encapsulating the inertia and uses a reflexive reaction to the inertia being created to rotate the shell when the shell is acted upon by an external force such as a servo mechanism. In the case of using a servo mechanism, the force of the servo and the inertia balance each other when directing the thrust created in the gyroscopic flywheels. Further, the disclosed vehicle may include a flexible tube that connects the bottom of the motor to the penetration in the sphere. The inertia within the gyroscope motor thereby assists directional change.

The gyroscopic inertia and torque leverage of the gyroscope motor (motor) created within the propulsion system allows for a compact aerial vehicle that stabilizes internally greatly reducing the impact of adverse atmospheric conditions and allowing for an easy-to-drive/pilot vehicle. The motors associated with the disclosed vehicle may be powered by either fuel cells or electric batteries.

Further, the disclosed vehicle may include a hemispherical guard for safety that protects the vehicle's surroundings and constitutes the upper part of the outer shell. The reflexive propulsion system may be further protected by physical barriers or bumpers rigidly mounted to the PAV's bodywork to protect the propulsion system and its surroundings if the PAV was to come into unintended physical contact with its surrounding.

The disclosed vehicle may be communicatively coupled to a central computer (or a computer) utilizing a fly-by-wires system controlling the speed of the flywheel/motors and servomechanisms that actuate the rotatable reflexive shell. The computer, including avionics, allows for autonomous control of the disclosed vehicle, whereby the driver may input commands through a steering wheel, floor pedals, or other control apparatus to create a flight path.

The propulsion system may be based on the fundamental stabilizing effects of a gyroscope. The propulsion system may be in essence a gyroscope where the flywheel portion of the gyroscope also contains the permanent magnets that may be used in an electric motor. When the motor/gyroscope rotates, gyroscopic inertia is created. There are two flywheels or more but in even numbers of counter-rotating flywheels to balance torque.

Further, spokes on the flywheels may include an airfoil cross-section that, when rotated, may create directional thrust. The counter-rotating flywheels may create thrust in the same way but because they turn in opposite directions. Further, the aerodynamic cross-sections may be reversed to maintain unidirectional airflow.

Further, proximate to the flywheels, the disclosed vehicle may include the stators that contain field coils that create phasing electromagnetic fields through a motor controller. The phasing magnetic fields act upon the permanent magnets in the flywheels and cause rotation of the flywheels. The flywheels and the stators may be housed in a motor casing that contains a central hub and bearings to allow free rotation of the flywheels.

Further, the motor housing may be further rigidly mounted in a gimbal housing with two large gimbal roller/thrust bearing bearings (or bearings), namely, one vertical and one horizontal. Further, the inside ring of the two bearings is fixed to the thrust chamber.

Further, the disclosed vehicle may include a sphere surrounding the gimbal, where the upper portion is a spherical guard and the lower portion is a nozzle for the thrust from the flywheels. The outer rings of the gimbal bearings may be attached to the spherical chamber.

Further, the bearings allow the motor and its flywheels to stay vertically oriented regardless of the orientation of the outer sphere.

Further, the core of the motor remains stable due to inertia. Further, the outer sphere that directs thrust from the flywheels may be pushed against this inertia to direct thrust. When the servomechanism pushes against the gimbal, it momentarily unbalances the system where the inertia then helps to maintain the thrust direction as it returns to a neutral position rather than competing with it. Further, the disclosed vehicle (or personal air vehicle) allows a user to take off vertically and fly to the user's destination at a useful altitude from 1 inch to over 20,000 feet, depending on the PAV configuration. Because of the vehicle's compact, powerful and reflexive inertia stabilizing propulsion, the disclosed vehicle may have a compact design like a sports car and be parked inside an average two-car garage or other suitable space.

Further, the PAV preferably utilizes four peripheral reflexive propulsion systems. An alternative number of peripheral propulsion assemblies may be used, depending on the main body configuration and intended usage of the PAV. For example, the PAV may be operated with a single propulsion system connected to the rear of the main body and with a single propulsion system connected to the front.

The reflexive propulsion system provides vertical takeoff and landing abilities as well as horizontal flight paths.

Further, the peripheral propulsion assembly may include two counter-rotating flywheel/rotors (upper flywheel and lower flywheel), each with opposite pitch, and each with integrated magnetic rings. Each flywheel contains thrust and roller bearings to allow them to freely rotate on a spindle.

Further, the disclosed vehicle may include a cross member for locating a fixed hub containing the spindle within the motor casing.

Further, the motor case housing includes two stators (upper stator and lower stator) with field coils that force the two rotor rings to rotate in opposite directions.

Further, in some embodiments, the rotor and shroud can be constructed from a single construction.

Further, in an embodiment, the motor casing may be made of a composite that integrates field coils within its matrix eliminating the stator components as the motor casing becomes the stator.

Further, the counter-rotating rotors may eliminate the rotational torque of the central rotor assembly. In operation, the integrated magnetic rings may become a gyroscope due to the inherent weight of the magnetic elements and rings.

Further, the motor casing is rigidly mounted inside an inner duct housing.

Further, a gimbal associated with the disclosed vehicle may include a horizontal roller/thrust bearing and a vertical roller/thrust bearing that may allow the inner duct housing to freely rotate in any of 360 degrees (horizontally or vertically).

Further, a lower sphere associated with the disclosed vehicle may be attached to the outer ring of the horizontal roller/thrust bearing as well as the outer ring of the vertical roller bearing. Further, all housings may be made of lightweight composite material, aluminum, or other suitable materials.

Further, in an alternate embodiment, the horizontal roller/thrust bearing may be removed and the gimbal containing the single vertical bearing allows movement in any of 180 degrees.

Further, a flexible nozzle comprised in the disclosed vehicle connects the lower inner duct housing with the exit of a lower hemisphere in its polar location so that when airflow is created within the inner assembly, the thrust may be vectored by rotating the lower hemisphere.

Further, an upper shield/guard hemisphere comprised in the disclosed vehicle may be rigidly mounted to the lower hemisphere to protect the immediate surroundings of the propulsion system, while bumpers further protect the propulsion assemblies.

Further, in some embodiments, the hemispherical guard may be connected to the inner duct housing.

Further, the fuselage of the PAV may include mounting points for landing gear at the bottom of the fuselage.

Further, in embodiments, the PAV may include vehicle wheels for use on traditional roadways. Further, the disclosed vehicle may be configured to meet the requirements for driving on such surfaces. The wheels can be powered by external or internal electric or gas motors along with breaks. Steering and power are done fly by wire like the airborne propulsion system.

Further, in some embodiments, the disclosed vehicle may include a plurality of airbags placed in areas to protect the occupants in the case of an accident.

Further, the PAV may include a transparent windshield, a transparent rear window, and two pivotally hinged doors connectably integrated with a cockpit. Furthermore, the PAV body may be made of composite, aluminum, or other suitable material with transparent window material encompassing most of the surface to serve as the side windows. The PAV may include a transparent material of oval or other suitable shape located throughout to provide additional viewing angles. The side doors may pivot wide open to allow for loading/unloading of large loads; e.g., an emergency stretcher or large cargo.

Further, in some embodiments, the disclosed vehicle may include a one-seat cabin. Further, in some embodiments, the disclosed vehicle may include fewer or more than two seats. Further, in some embodiments, the disclosed vehicle may be utilized as an unmanned aerial vehicle (UAV) with no seats. Further, in some embodiments, the PAV may be scaled to operate as a small remotely controlled device for a hobbyist or commercially to deliver parcels or used for capturing video or photographic images.

Further, in some embodiments, a flight computer associated with the disclosed vehicle may be controlled by a fly-by-wire system that calculates gyroscopic stability and sends information to the four propulsion systems to assist in maintaining flight paths.

Further, the computer may fly the vehicle autonomously while inputs from the pilot may alter the flight path. The bottom of the car/PAV may serve as an attachment point for landing gear (not shown) or a safety airbag device in the case of a crash landing.

Alternatively, the forward section of the PAV may serve as a mounting point for pivoting landing gear to provide a tight turning radius. The PAV may optionally include headlights/landing lights in the forward area of the PAV. The PAV may optionally include taillights, including a streamlined transparent protective covering, located in the aft bumpers or PAV body. Further, the navigation lights may be preferably located in the same locations as on a road-going vehicle. Further, power, weather batteries, fuel cells, and other new technologies that may be used to power the vehicle may be preferably located behind the bulkhead of the cabin and below the storage compartment below the rear window.

Further, in some embodiments, the disclosed vehicle may include an emergency parachute with a deployment rocket launcher stored in a storage location compartment in the rear of the vehicle.

Further, avionics including the PAV's gyroscopic equipment, etc. may be located inside the passenger compartment. Further, avionics provides for guidance, navigation, and control; for example, it may serve as a data bus that takes the night instrumentation, weather, and additional data, along with pilot input, to control flight.

Further, the disclosed vehicle may include a second bay located in the back for redundancy. The flight computer may use the avionics to continuously balance and stabilize the PAV.

Further, in some embodiments, the PAV may include proximity detectors working in conjunction with the avionics to monitor the PAV and its surroundings to alter the flight path to avoid any collisions or landings that may damage the PAV.

Further, in some embodiments, the PAV may include an integrated flight training computer that, when activated, takes the pilot through a series of training routines and requires a predetermined proficiency before allowing the pilot to freely pilot the PAV. Either the flight computer, the integrated flight training computer, or other computer systems may also be used as a controlled flight governor that restricts the altitude and speed of the PAV based on one or more predetermined criteria, for example, based on safety parameters or pending pilot proficiency indicators.

Further, in some embodiments, the disclosed vehicle may include external cameras that may further provide external views in any direction and be displayed on screens located in the driver/passenger compartment.

Further, in some embodiments, instead of battery power, the central rotor assembly and/or four peripheral rotor assemblies may be powered by one or more external electric motors, combustion engines, or other fuel sources. In an alternative embodiment, the cockpit may be encompassed by stator windings that act upon magnets contained in the inner circumference of the central rotor and function as an electric in-runner motor. If an independent electric motor is connected to the central rotor assembly, the stator windings located in the shroud may be removed.

Further, in some embodiments, the disclosed vehicle may utilize a combustion engine. Further, for utilizing a combustion engine, the stator windings of the central rotor assembly may also be removed. The weight of the magnets in the rotor shroud may be positioned to create a heightened gyroscopic effect in the spinning rotor, adding stability to the PAV.

Further, the disclosed vehicle may include a flying vehicle with the fuselage having a longitudinal axis, the cockpit extending substantially from the center of the fuselage with four reflexive inertia drive motors for propulsion. Further, all motors and control systems are controlled by a fly-by-wire with a system integrated into a central computer with avionics allowing for autonomous flight.

Further, the present disclosure relates generally to vertical take-off and landing (VTOL) aircraft. More specifically, the present disclosure describes a reflexive inertia propulsion-powered personal air vehicle (PAV).

FIG. 1 is a disassembled view of an apparatus 100 for facilitating propulsion of a vehicle 1002, in accordance with some embodiments. Accordingly, the apparatus 100 may include a housing 102, a propulsion mechanism 104, and a gimbal 106. Further, the vehicle 1002 may be a personal air vehicle (PAV). Further, the PAV may be a reflexive inertia propulsion powered personal air vehicle (PAV).

Further, the housing 102 may include an interior space 108, an inlet 110, and an outlet 112. Further, the housing 102 may be spherically shaped. Further, the inlet 110 may include a plurality of openings in a first polar location of the housing 110 and the outlet may include an opening in a second polar location opposite to the first polar location of the housing 110.

Figure 2:
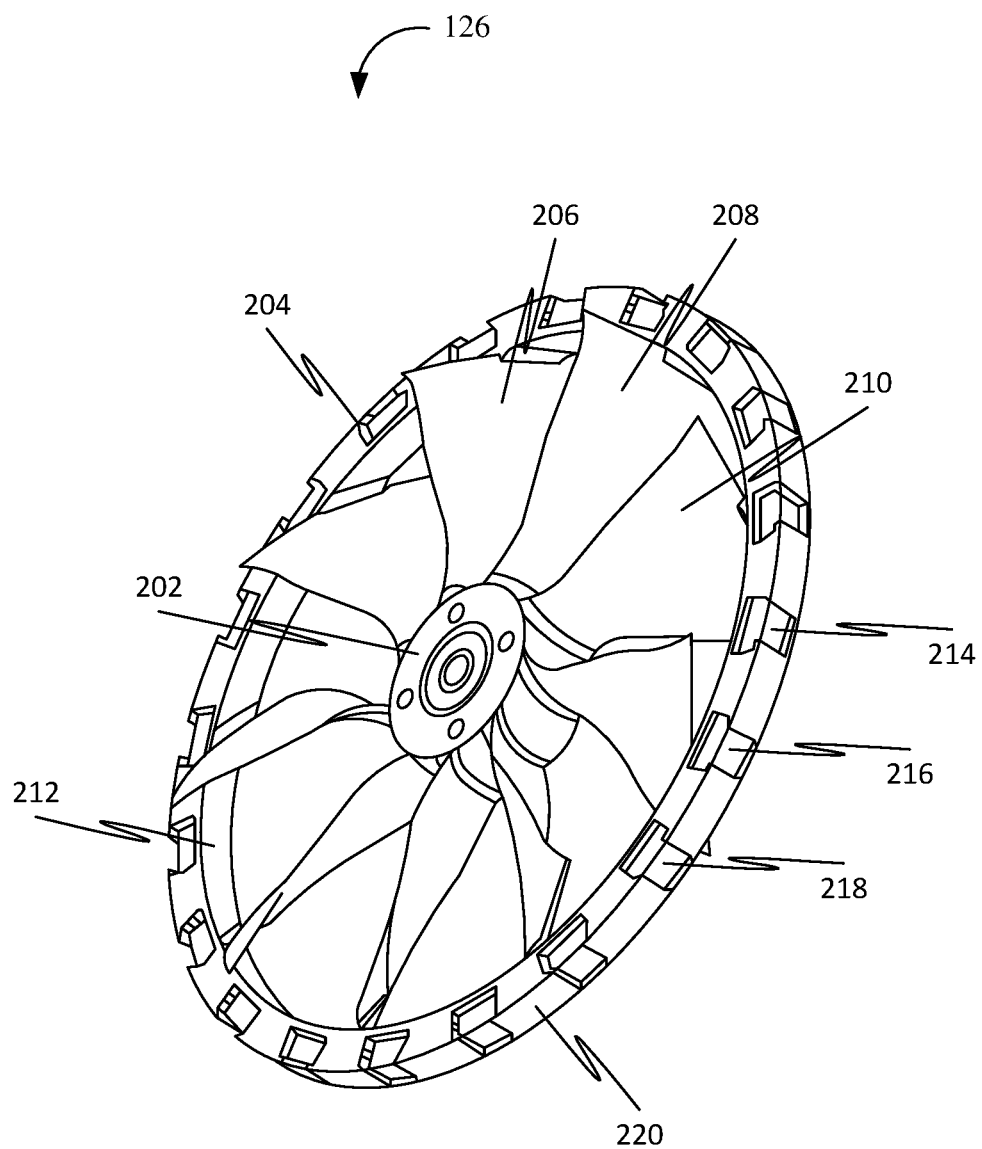
FIG. 2 is a perspective view of the upper rotor of the propulsion mechanism, in accordance with some embodiments.
Figure 3:
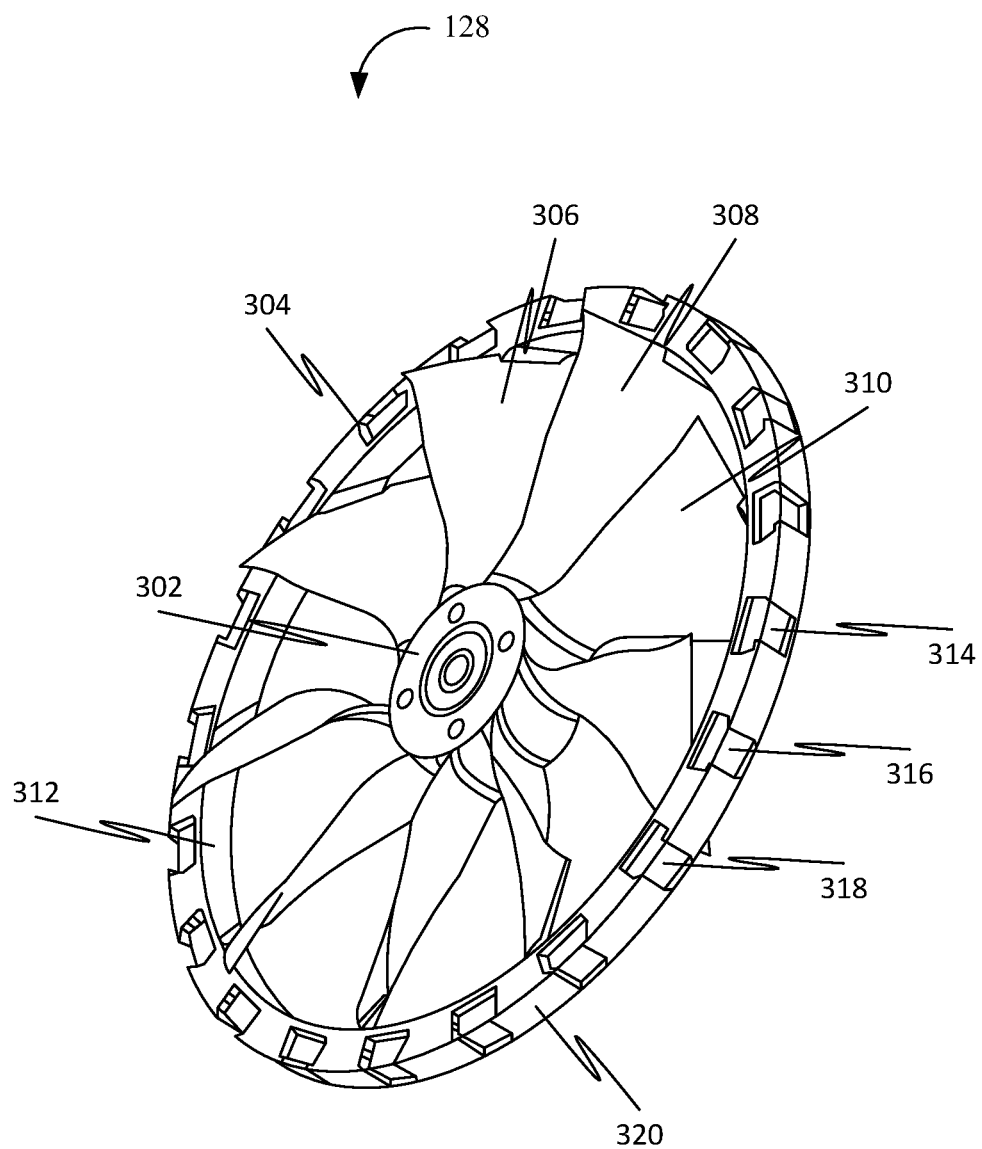
FIG. 3 is a perspective view of the lower rotor of the propulsion mechanism, in accordance with some embodiments.

Further, the propulsion mechanism 104 may be disposed in the interior space 108. Further, the propulsion mechanism 104 may include a hub 116 and a spindle 114 (shaft) rotatably mounted within the hub 116. Further, a first portion 118 of the spindle 114 extends away from a top side 122 of the hub 116 and a second portion 120 of the spindle 114 extends away from a bottom side 124 of the hub 116. Further, the propulsion mechanism 104 may include an upper rotor 126 rotatably mounted on the first portion 118 and a lower rotor 128 rotatably mounted on the second portion 120. Further, the upper rotor 126 may be configured to be rotated about a central axis of the spindle 114 in a first direction using an upper stator 130 and the lower rotor 128 may be configured to be rotated about the central axis of the spindle 114 in a second direction opposite to the first direction using a lower stator 132. Further, the first direction may include a clockwise direction and the second direction may include a counterclockwise direction. Further, the upper rotor 126 may include a plurality of upper rotor blades 206-210, as shown in FIG. 2, with a first blade pitch and the lower rotor 128 may include a plurality of lower rotor 306-310, as shown in FIG. 3, blades with a second blade pitch opposite to the first blade pitch. Further, the rotating of the upper rotor 126 in the first direction and the lower rotor 128 in the second direction creates a fluid flow from the inlet 110 to the outlet 112 for generating a directional thrust. Further, the fluid flow may be unidirectional. Further, the fluid flow may be an airflow, a water flow, etc. Further, the generating of the directional thrust facilitates the propulsion of the vehicle 1002.

Further, the gimbal 106 may be disposed in the interior space 108. Further, the gimbal 106 may be configured for rotatably attaching the propulsion mechanism 104 to the housing 102. Further, the housing 102 may be rotatable in relation to the propulsion mechanism 104 for vectoring the directional thrust based on the rotatably attaching. Further, the generating of the directional thrust and the vectoring of the directional thrust facilitates at least one propelling action associated with the propulsion of the vehicle 1002. Further, the vectoring may include changing a direction of the directional thrust.

Further, in some embodiments, the upper rotor 126 may include an upper rotor hub 202 and an upper rim 204 disposed around the upper rotor hub 202, as shown in FIG. 2. Further, the plurality of upper rotor blades 206-210 radially extends from the upper rotor hub 202 to an inner surface 212 of the upper rim 204. Further, the lower rotor 128 may include a lower rotor hub 302 and a lower rim 304 disposed around the lower rotor hub 302, as shown in FIG. 3. Further, the plurality of lower rotor blades 306-310 radially extends from the lower rotor hub 302 to an inner surface 312 of the lower rim 304.

Figure 4:
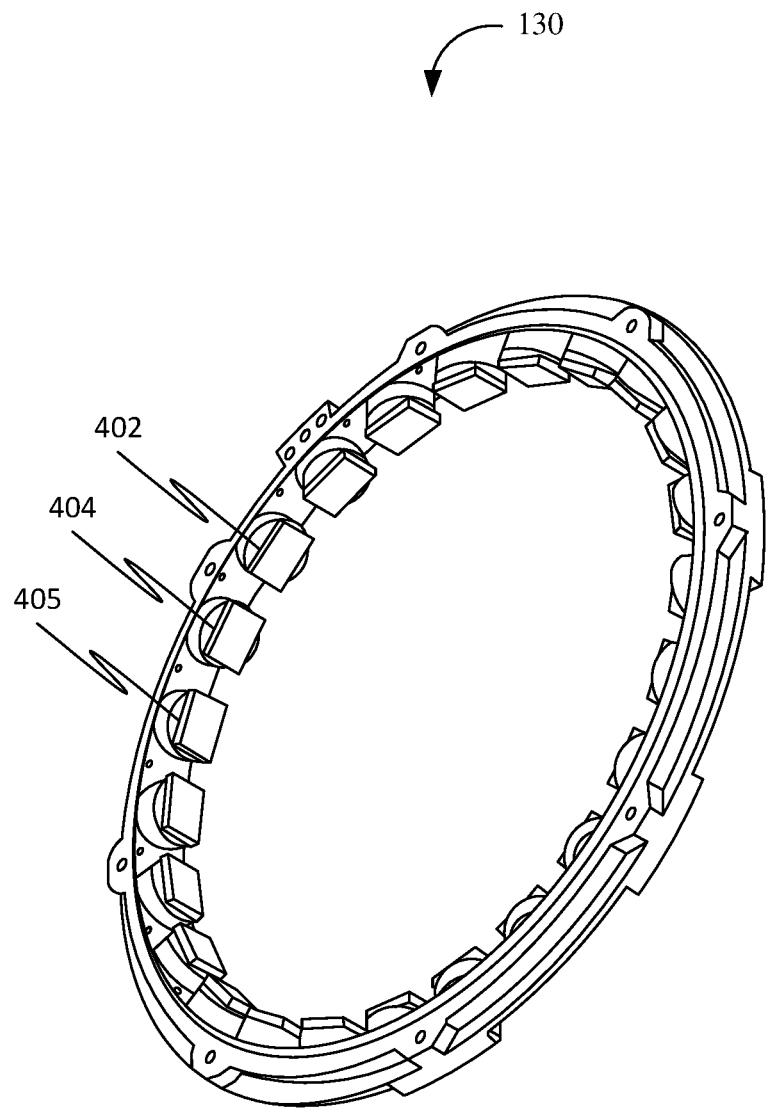
FIG. 4 is a perspective view of the upper stator of the propulsion mechanism, in accordance with some embodiments.
Figure 5:
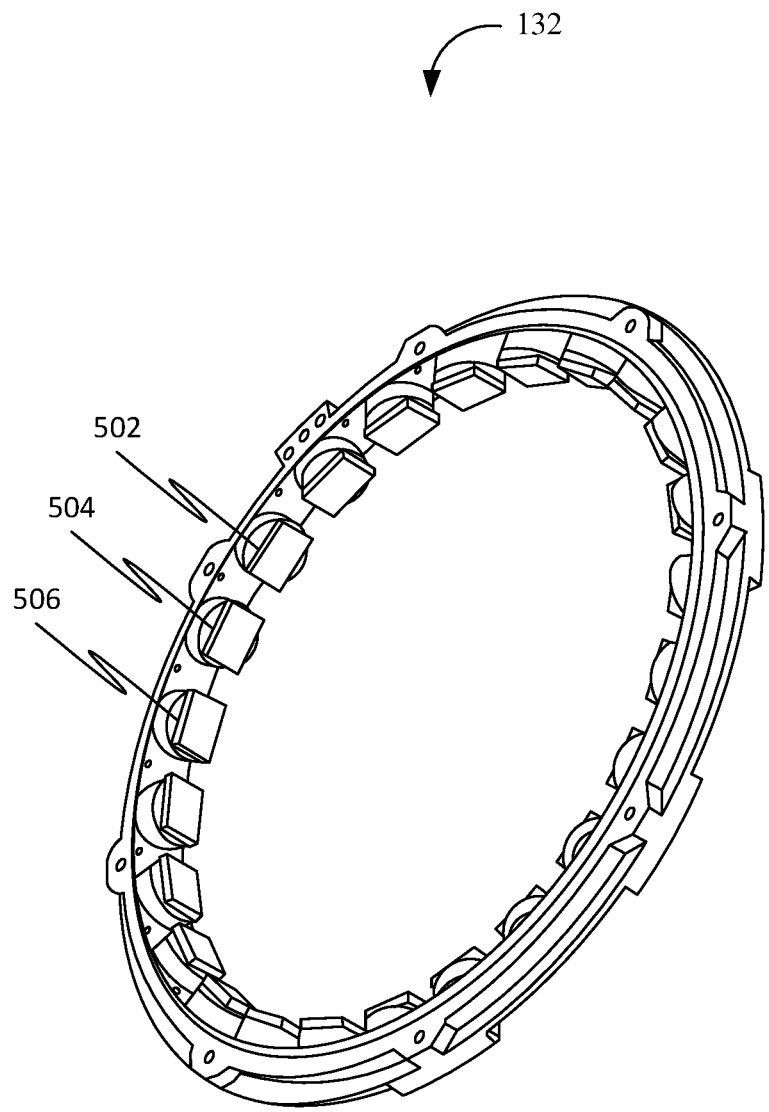
FIG. 5 is a perspective view of the lower stator of the propulsion mechanism, in accordance with some embodiments.

Further, in an embodiment, the upper rim 204 may include a plurality of upper rim magnets 214-218 integrated into an outer surface 220 of the upper rim 204 and the lower rim 304 may include a plurality of lower rim magnets 314-318 integrated into an outer surface 320 of the lower rim 304. Further, the upper stator 130 may be disposed around the upper rotor 126 and the lower stator 132 may be disposed around the lower rotor 128. Further, the upper stator 130 may include a plurality of upper stator coils 402-406, as shown in FIG. 4, corresponding to the plurality of upper rim magnets 214-218 and the lower stator 132 may include a plurality of lower stator coils 502-506, as shown in FIG. 5, corresponding to the plurality of lower rim magnets 314-318. Further, the plurality of upper stator coils 402-406 and the plurality of lower stator coils 502-506 may be energized for the rotating of the upper rotor 126 in the first direction and the lower rotor 128 in the second direction. Further, at least one of a battery and a fuel cell may be used to energize the plurality of upper stator coils 402-406 and the plurality of lower stator coils 502-506.

Figure 6:
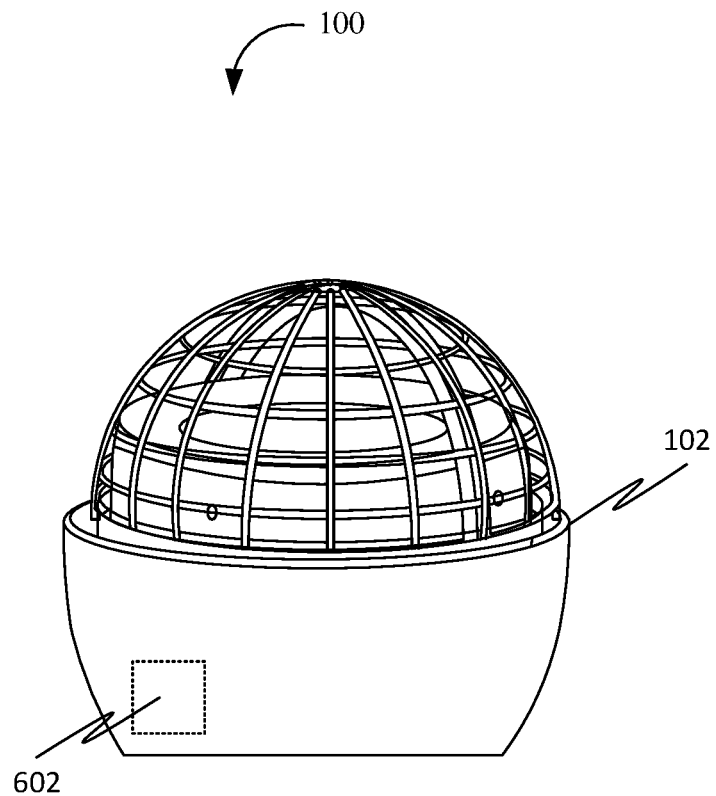
FIG. 6 is a front view of the apparatus, in accordance with some embodiments.

In an embodiment, the apparatus 100 may include a controller 602, as shown in FIG. 6. Further, the controller 602 may be coupled with at least one of the plurality of upper stator coils 402-406 and the plurality of lower stator coils 502-506. Further, the controller 602 may be configured for controlling the energizing of at least one of the plurality of upper stator coils 402-406 and the plurality of lower stator coils 502-506 based on at least one first input received by the controller 602. Further, the controller 602 may be an electrically powered actuator. Further, the at least one first input may include a flight path of the vehicle 1002.

Figure 7:
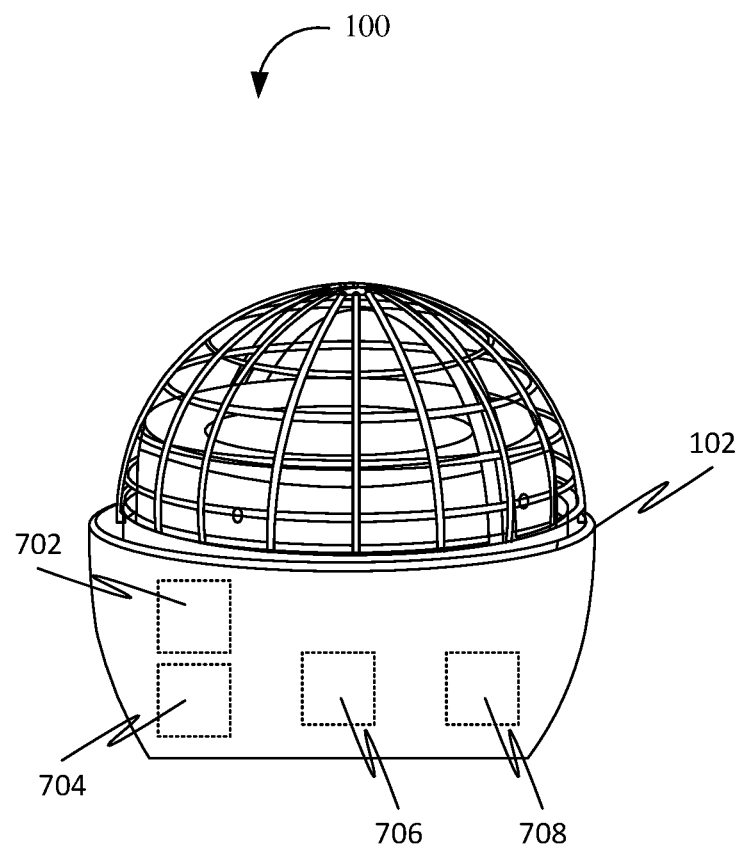
FIG. 7 is a front view of the apparatus, in accordance with some embodiments.

In an embodiment, the apparatus 100 further may include at least one of an external sensor 702 and an internal sensor 704, a processing device 706, and a communication device 708, as shown in FIG. 7. Further, the external sensor 702 may include a proximity sensor, a location sensor, an airflow sensor, a camera, etc. Further, the internal sensor may include an orientation sensor, a motion sensor, etc. Further, at least one of the external sensor 702 and the internal sensor 704 may be configured for generating at least one sensor data based on detecting at least one of an internal characteristic and an external characteristic associated with the apparatus 100. Further, the internal characteristic may include orientation, velocity, etc. of the apparatus 100. Further, the external characteristic may include a proximity of the apparatus 100 to objects, airflow, location, etc. of the apparatus 100. Further, the processing device 706 may be communicatively coupled with at least one of the external sensor 702 and the internal sensor 704. Further, the processing device 706 may be configured for analyzing the at least one sensor data. Further, the processing device 706 may be configured for determining at least one energizing condition for the energizing based on the analyzing. Further, the at least one energizing condition corresponds to at least one rotational characteristic of at least one of the upper rotor 126 and the lower rotor 128. Further, the at least one rotational characteristic may include a speed of the rotation, a direction of the rotation, etc. Further, the processing device 706 may be configured for generating the at least one first input for the controller 602 based on the determining. Further, the communication device 708 may be communicatively coupled with the processing device 706. Further, the communication device 708 may be configured for transmitting the at least one first input to the controller 602.

Figure 8:
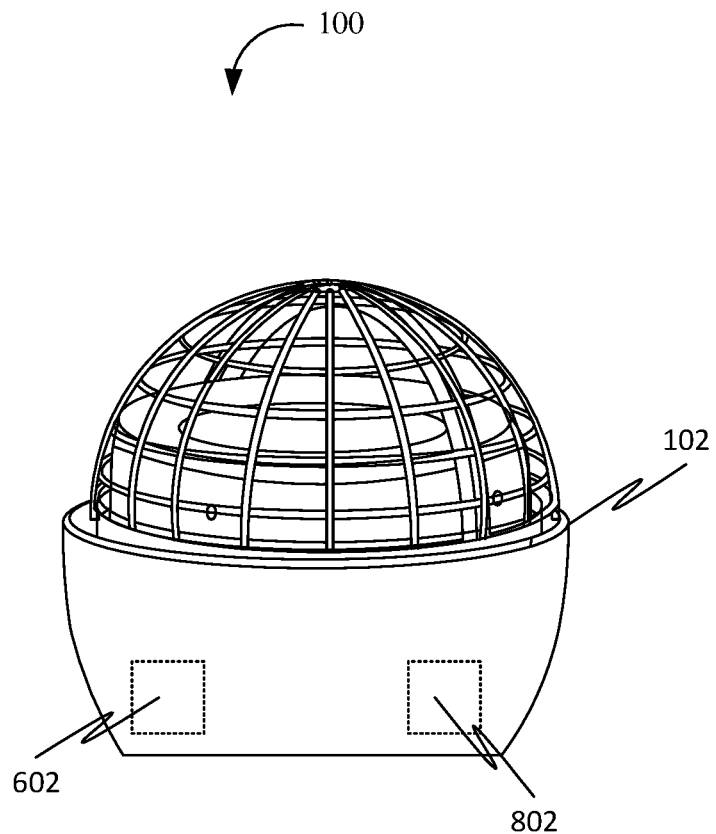
FIG. 8 is a front view of the apparatus, in accordance with some embodiments.

Further, in an embodiment, the controller 602 may be coupled to a rotating mechanism 802, as shown in FIG. 8, associated with the housing 102. Further, the rotating mechanism 802 rotates the housing 102 for the vectoring of the directional thrust. Further, the controller 602 may be configured for controlling the rotating of the housing 102 based on at least one second input received by the controller 602. Further, the rotating mechanism 802 may be a servo mechanism comprising electric motors. Further, the at least one second input may include the flight path of the vehicle 1002.

Further, in an embodiment, the processing device 706 may be configured for determining a position of the housing 102 from a plurality of positions of the housing 102 in relation to the propulsion mechanism 104 based on the analyzing. Further, the processing device 706 may be configured for generating the at least one second input based on the determining of the position. Further, the communication device 708 may be configured for transmitting the at least one second input to the controller 602.

Further, in some embodiments, a cross-section of each of the plurality of upper rotor blades 206-210 and each of the plurality of lower rotor blades 306-310 may be an airfoil cross-section. Further, the creating of the fluid flow from the inlet 110 to the outlet 112 may be based on the airfoil cross-section of each of the plurality of upper rotor blades 206-210 and each of the plurality of lower rotor blades 306-310.

Further, in some embodiments, the gimbal 106 may include a first roller bearing 134 and a second roller bearing 136. Further, the first roller bearing 134 may be disposed around the propulsion mechanism 104. Further, a first central axis of the first roller bearing 134 may be parallel to the central axis of the spindle 114. Further, a first inner ring 140 of the first roller bearing 134 may be coaxially attached to the hub 116 using at least one cross member 138. Further, the second roller bearing 136 may be disposed around the first roller bearing 134. Further, a second central axis of the second roller bearing 136 may be perpendicular to the first central axis. Further, a second inner ring 144 of the second roller bearing 136 may be perpendicularly attached to a first outer ring 142 of the first roller bearing 134. Further, a second outer ring 146 of the second roller bearing 136 may be attached to an inner surface 148 of the housing 102. Further, the first inner ring 140 may be rotatable in relation to the first outer ring 142 and the second inner ring 144 may be rotatable in relation to the second outer ring 146.

Further, in some embodiments, the propulsion mechanism 104 further may include an upper motor case 902 and a lower motor case 904. Further, a first end 906 of the upper motor case 902 may be attached to a first end 908 of the lower motor case 904 forming a motor case interior space 910. Further, the upper motor case 902 houses the upper stator 130 and the upper rotor 126 and the lower motor case 904 houses the lower stator 132 and the lower rotor 128. Further, the hub 116 may be disposed in the motor case interior space 910.

Further, in an embodiment, the propulsion system further may include a top gimbal housing 912 and a bottom gimbal housing 914. Further, the top gimbal housing 912 may include a top opening 916 disposed on a first housing end 918 of the top gimbal housing 912 and the bottom gimbal housing 914 may include a bottom opening 920 disposed on a first housing end 922 of the bottom gimbal housing 914. Further, the top gimbal housing 912 houses the upper motor case 902 and the bottom gimbal housing 914 houses the lower motor case 904. Further, a second housing end 924 of the top gimbal housing 912 may be attached to a second housing end 926 of the bottom gimbal housing 914 defining a duct 928 from the top opening 916 to the bottom opening 920 through the motor case interior space 910. Further, the fluid flow may be created in the duct 928.

In an embodiment, the apparatus 100 may include a flexible nozzle 930. Further, the flexible nozzle may be configured for connecting the bottom opening 920 to the outlet 112 of the housing 102. Further, a first end 932 of the flexible nozzle 930 may be circumferentially attached to the first housing end 922 of the bottom gimbal housing 914 around the bottom opening 920 and a second end 934 of the flexible nozzle 930 may be attached to the housing 102 around the outlet 112.

Figure 10:
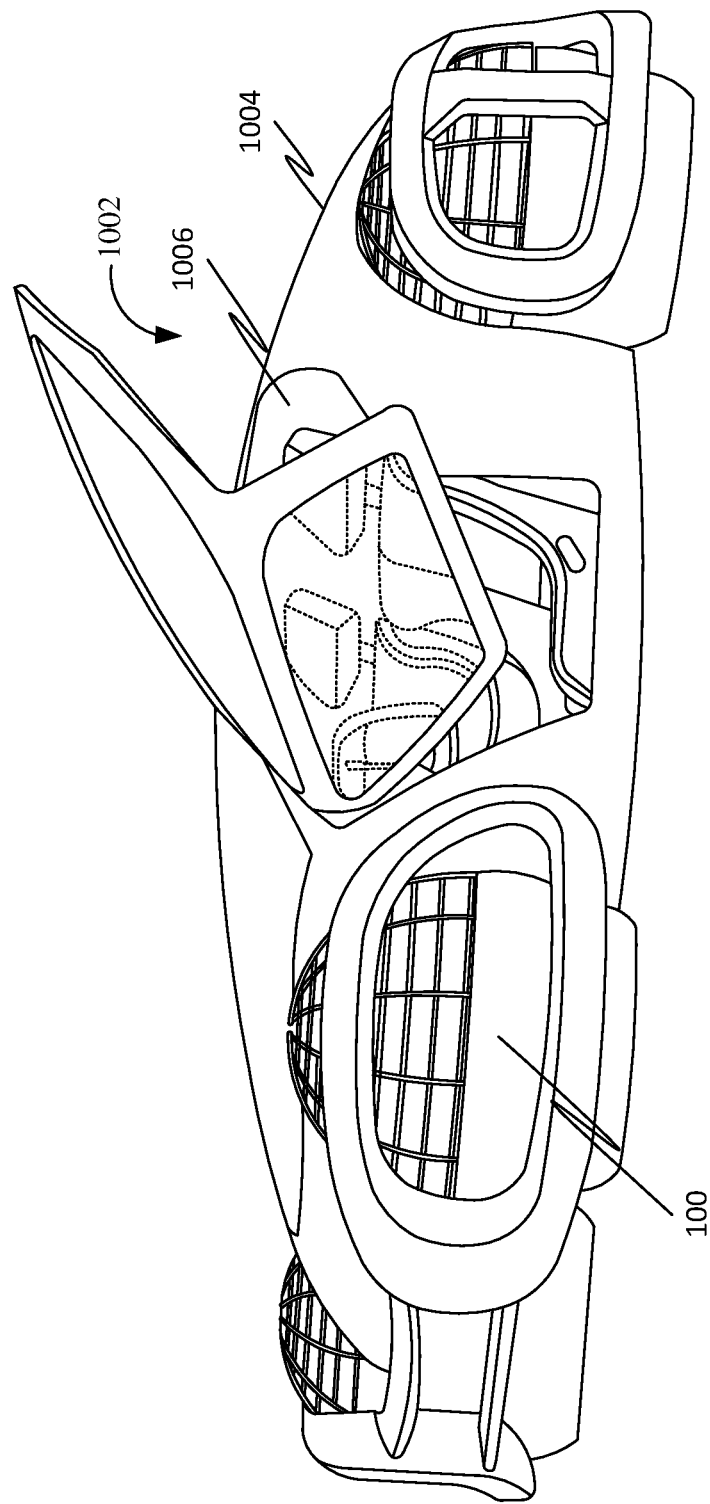
FIG. 10 is a side view of the vehicle with the apparatus, in accordance with some embodiments.

Further, in some embodiments, the apparatus 100 may be configured to be installed in the vehicle 1002, as shown in FIG. 10.

Further, in an embodiment, the vehicle 1002 may include a vehicle body 1004 defining a vehicle fuselage 1006. Further, the installing of the apparatus 100 to the vehicle 1002 may include connecting the apparatus 100 to the vehicle body 1004.

FIG. 2 is a perspective view of the upper rotor 126 of the propulsion mechanism 104, in accordance with some embodiments.

FIG. 3 is a perspective view of the lower rotor 128 of the propulsion mechanism 104, in accordance with some embodiments.

FIG. 4 is a perspective view of the upper stator 130 of the propulsion mechanism 104, in accordance with some embodiments.

FIG. 5 is a perspective view of the lower stator 132 of the propulsion mechanism 104, in accordance with some embodiments.

FIG. 6 is a front view of the apparatus 100, in accordance with some embodiments. FIG. 6 is an assembled view of the apparatus 100 in FIG. 1.

FIG. 7 is a front view of the apparatus 100, in accordance with some embodiments.

FIG. 8 is a front view of the apparatus 100, in accordance with some embodiments.

Figure 9:
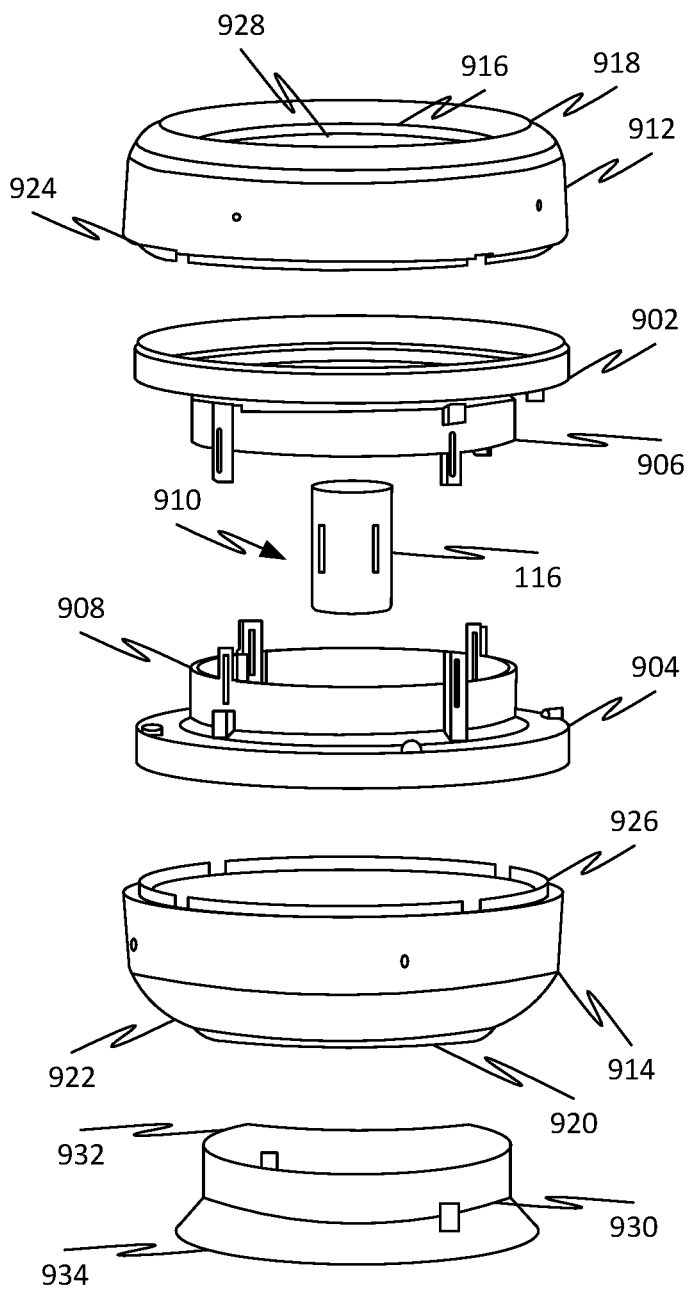
FIG. 9 is a disassembled view of the apparatus, in accordance with some embodiments.

FIG. 9 is a disassembled view of the apparatus 100, in accordance with some embodiments.

FIG. 10 is a side view of the vehicle 1002 with the apparatus 100, in accordance with some embodiments.

Figure 11:
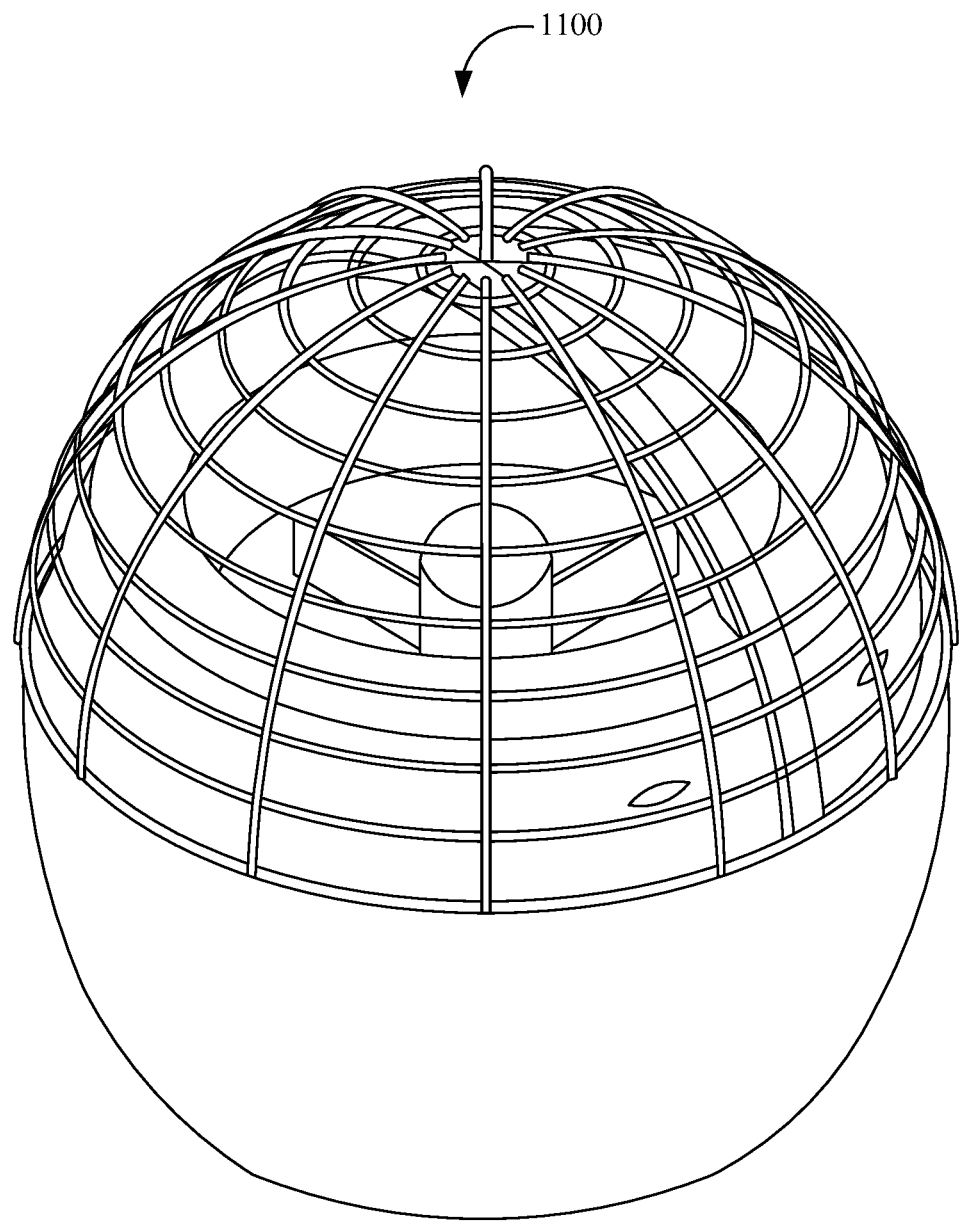
FIG. 11 is a top perspective view of an apparatus for facilitating propulsion of a vehicle, in accordance with some embodiments.

FIG. 11 is a top perspective view of an apparatus 1100 for facilitating propulsion of a vehicle, in accordance with some embodiments.

Figure 12:
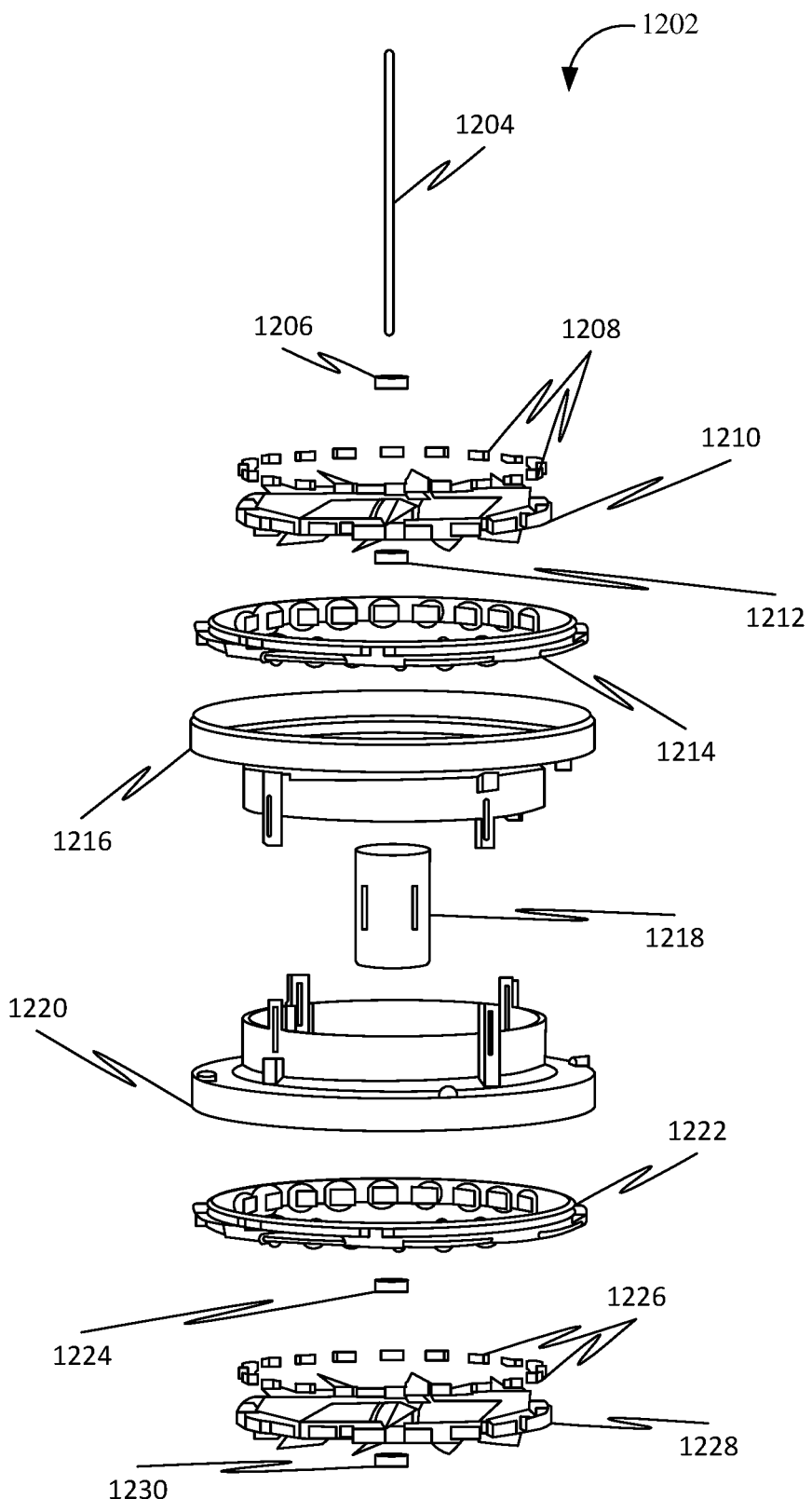
FIG. 12 is a disassembled view of a propulsion system of the apparatus, in accordance with some embodiments.

FIG. 12 is a disassembled view of a propulsion system 1202 of the apparatus 1100, in accordance with some embodiments. Further, the propulsion system 1202 may include a spindle 1204, a first thrust/roller bearing 1206, a plurality of upper magnets 1208, an upper rotor 1210, a second thrust/roller bearing 1212, an upper stator 1214, an upper motor case 1216, a fixed hub 1218, a lower motor case 1220, a lower stator 1222, a third roller/thrust bearing 1224, a plurality of lower magnets 1226, a lower rotor 1228, and a fourth roller/thrust bearing 1230.

Figure 13:
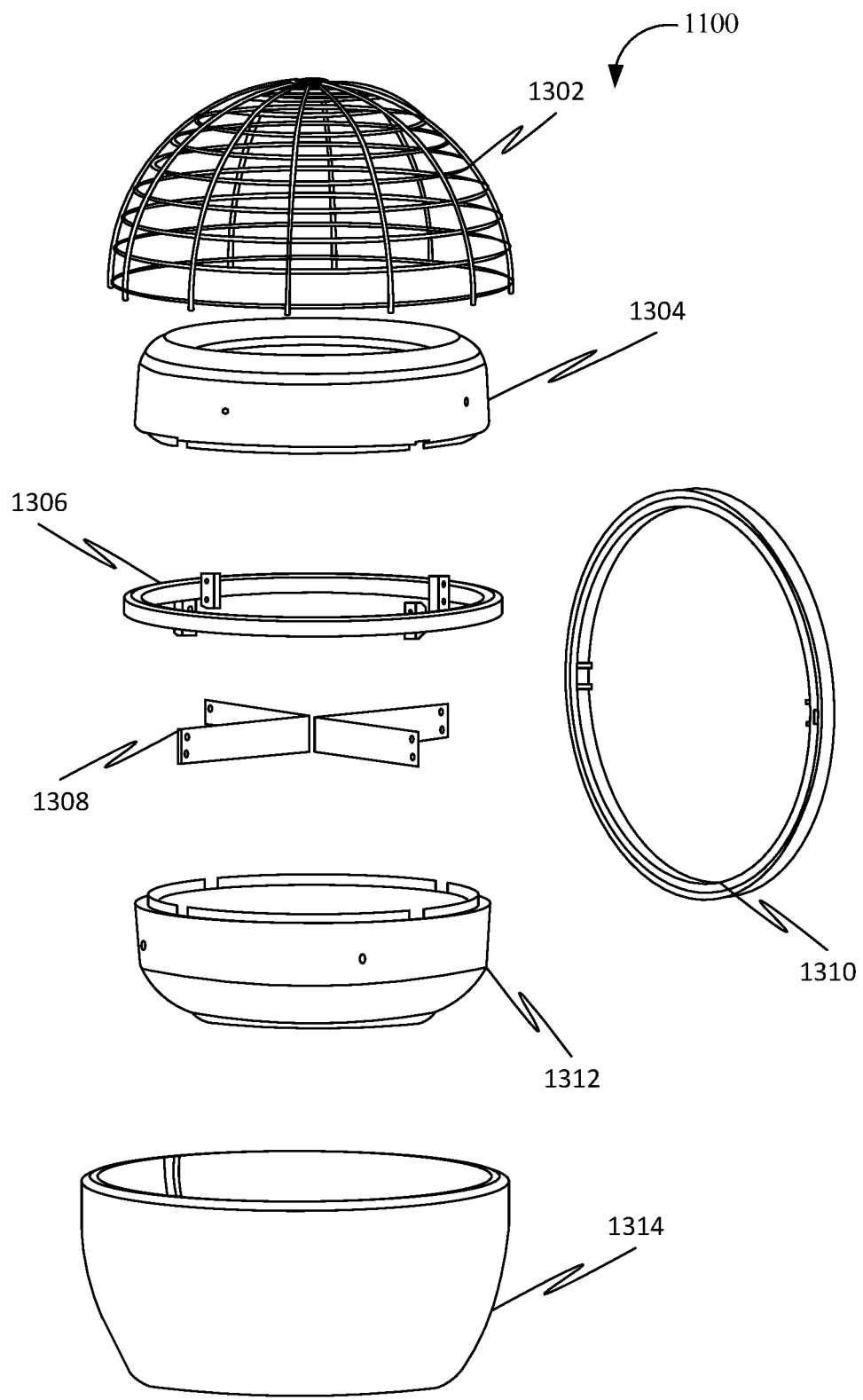
FIG. 13 is a disassembled view of the apparatus, in accordance with some embodiments.

FIG. 13 is a disassembled view of the apparatus 1100, in accordance with some embodiments. Further, the apparatus 1100 may include an upper guard 1302, a top gimbal housing 1304, a horizontal roller bearing 1306, a cross member 1308, a vertical roller bearing 1310, a bottom gimbal housing 1312, and a lower hemisphere 1314.

Figure 14:
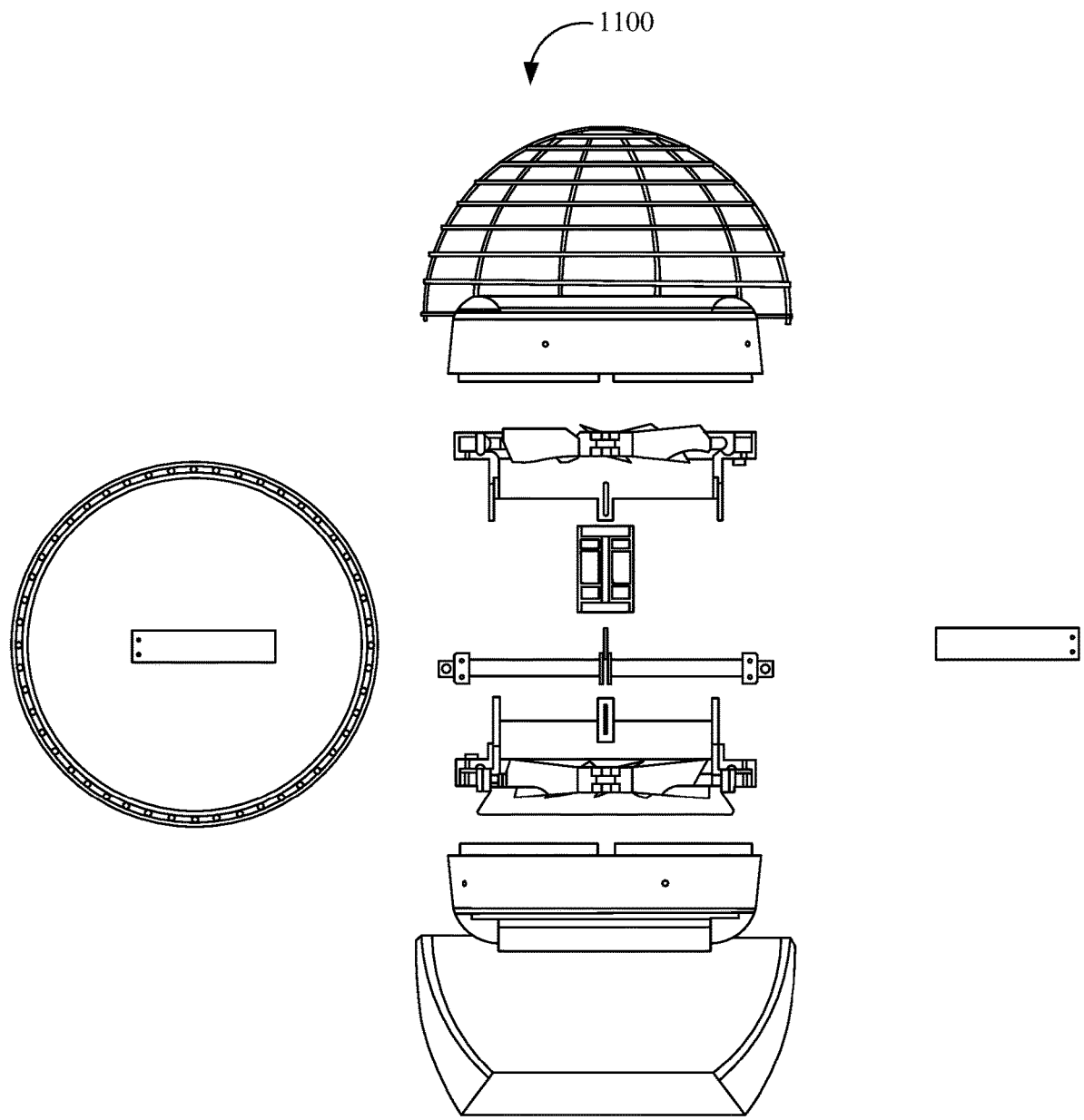
FIG. 14 is a cross-sectional disassembled view of the apparatus, in accordance with some embodiments.

FIG. 14 is a cross-sectional disassembled view of the apparatus 1100, in accordance with some embodiments.

Figure 15:
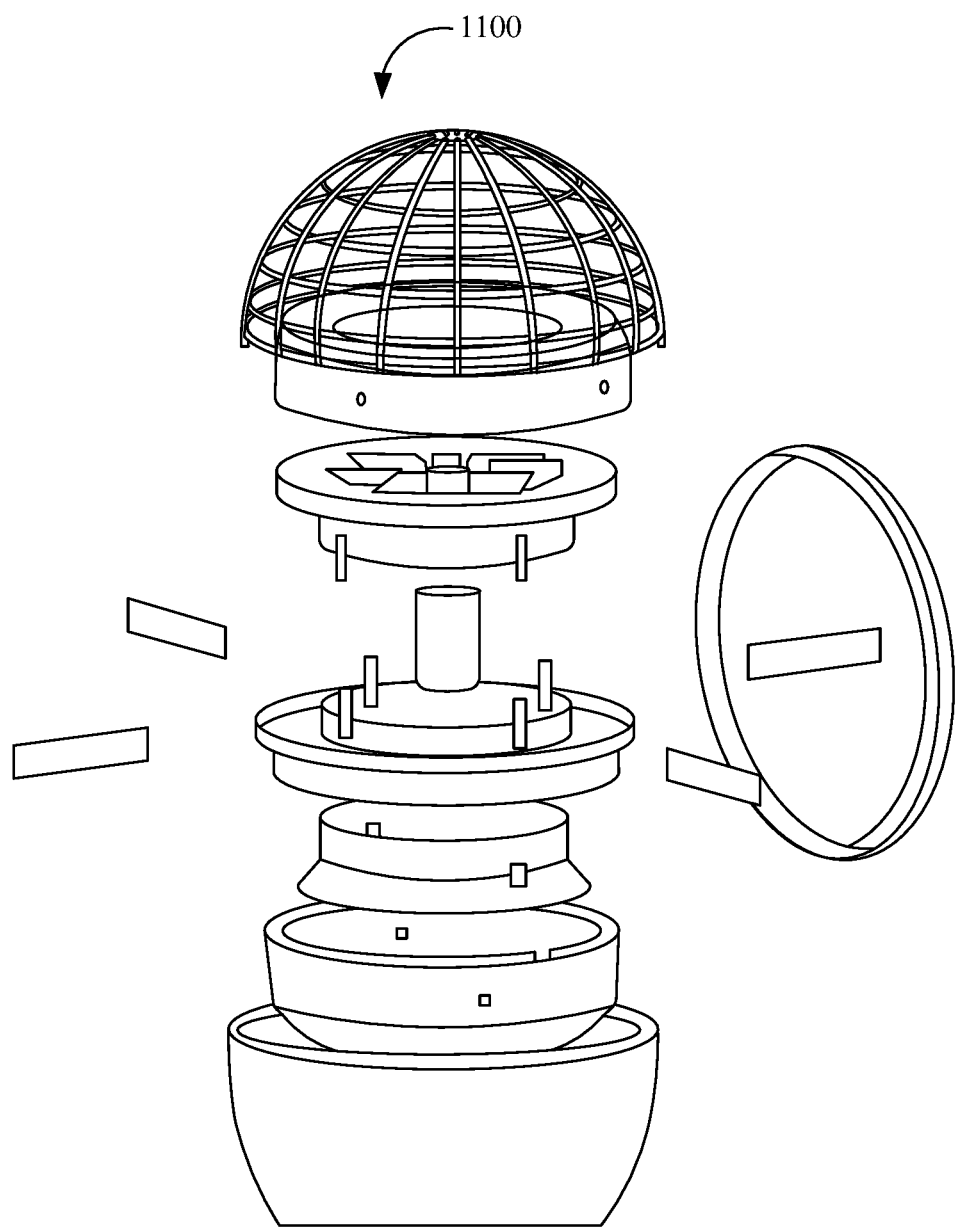
FIG. 15 is a disassembled view of the apparatus, in accordance with some embodiments.

FIG. 15 is a disassembled view of the apparatus 1100, in accordance with some embodiments.

Figure 16:
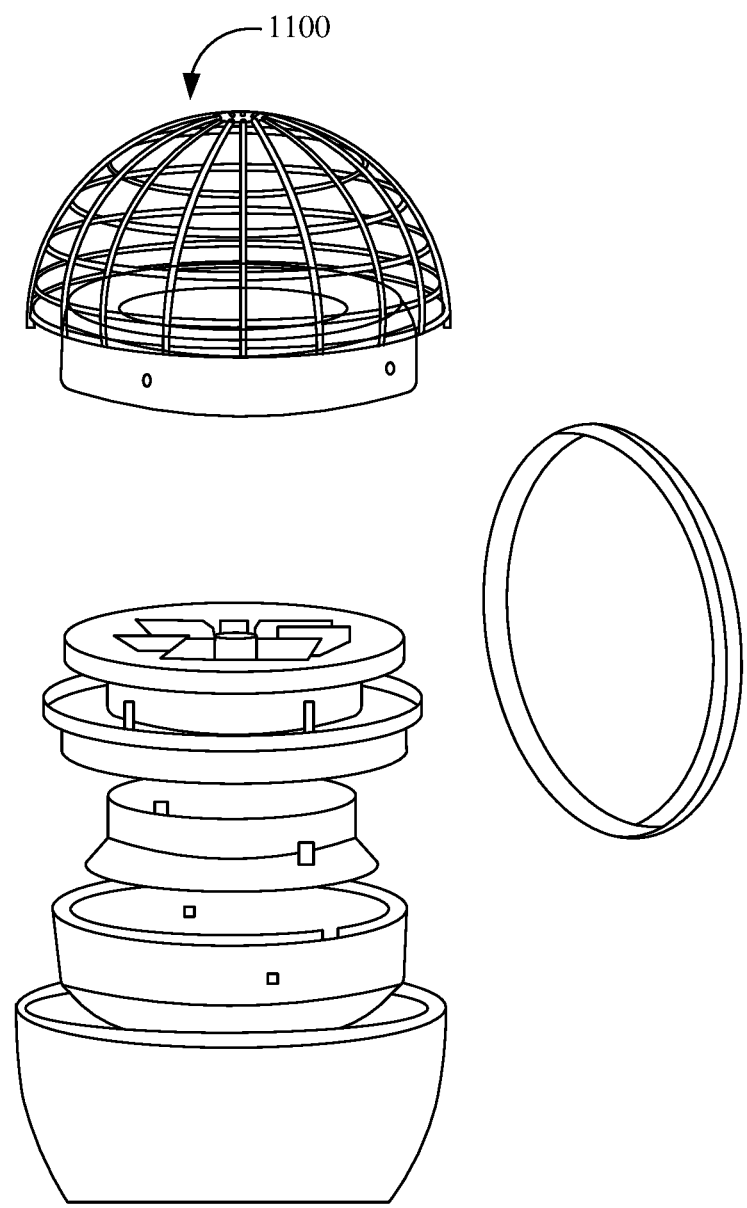
FIG. 16 is a disassembled view of the apparatus, in accordance with some embodiments.

FIG. 16 is a disassembled view of the apparatus 1100, in accordance with some embodiments.

Figure 17:
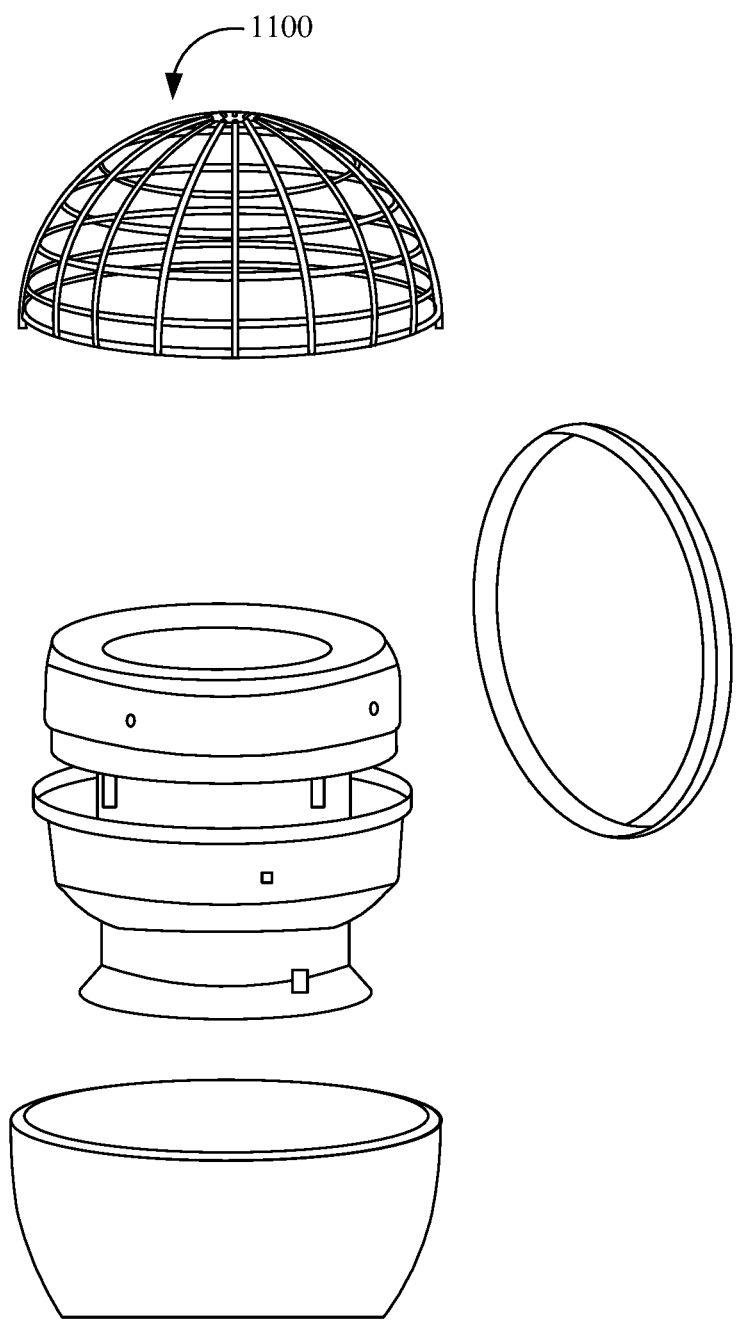
FIG. 17 is a disassembled view of the apparatus, in accordance with some embodiments.

FIG. 17 is a disassembled view of the apparatus 1100, in accordance with some embodiments.

Figure 18:
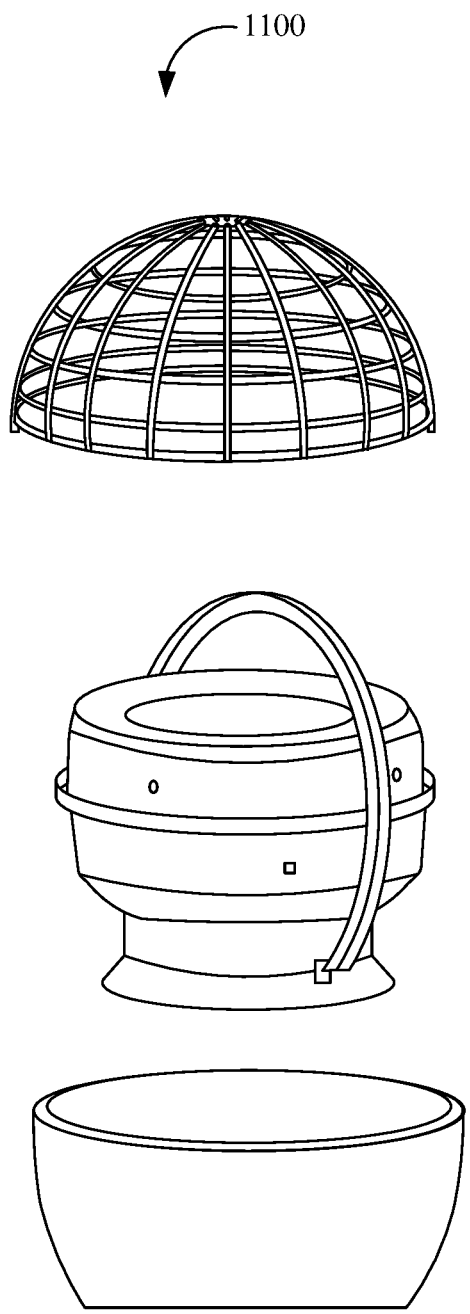
FIG. 18 is a disassembled view of the apparatus, in accordance with some embodiments.

FIG. 18 is a disassembled view of the apparatus 1100, in accordance with some embodiments.

Figure 19:
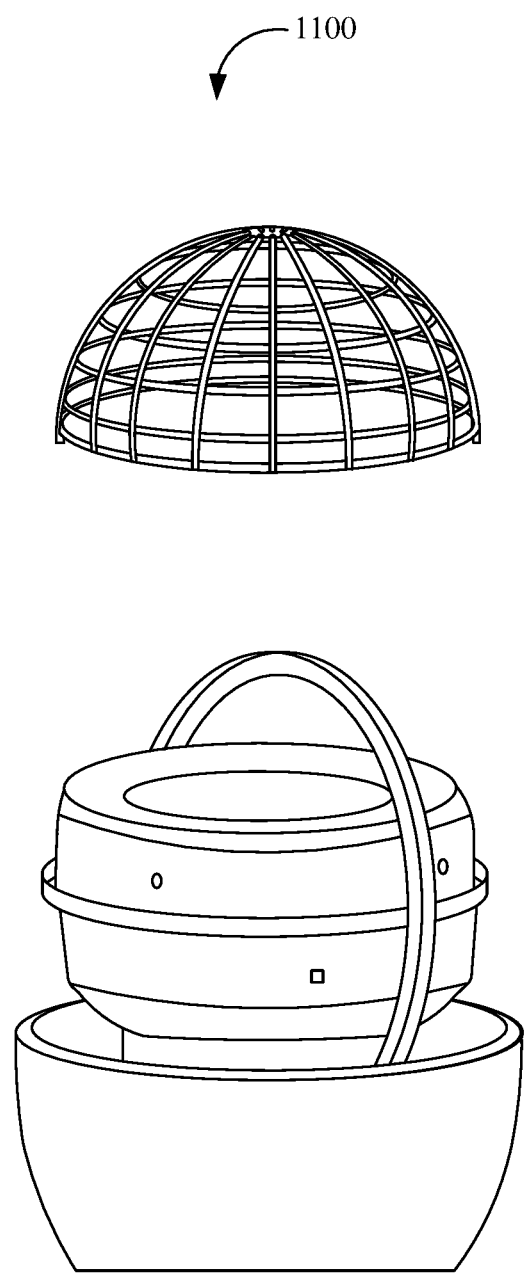
FIG. 19 is a disassembled view of the apparatus, in accordance with some embodiments.

FIG. 19 is a disassembled view of the apparatus 1100, in accordance with some embodiments.

Figure 20:
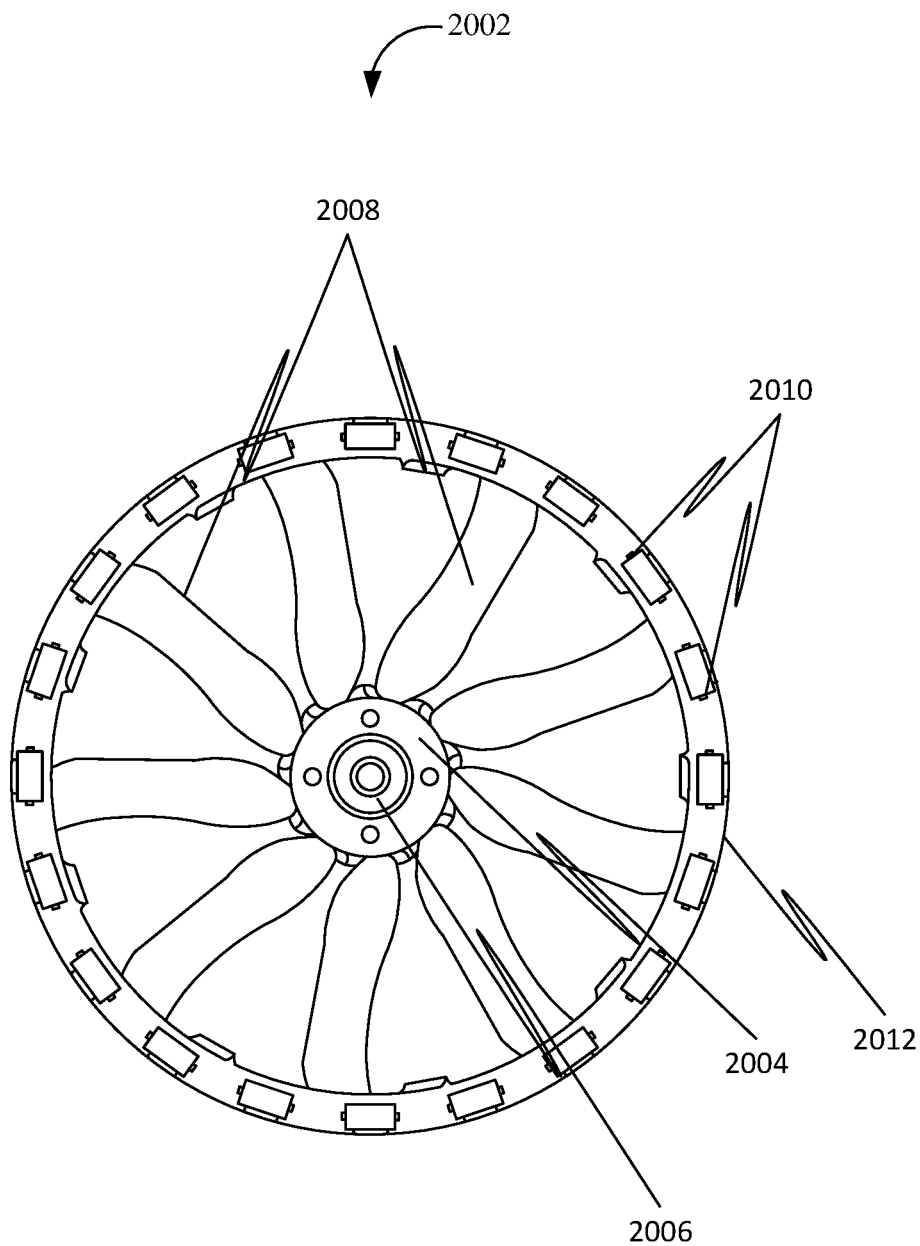
FIG. 20 is a top view of a rotor of the propulsion system, in accordance with some embodiments.

FIG. 20 is a top view of a rotor 2002 of the propulsion system 1202, in accordance with some embodiments. Further, the rotor 2002 (the upper rotor 126 and the lower rotor 128) may include a hub 2004 comprising a roller and thrust bearing 2006, a plurality of flywheel spokes (blades) 2008 with an airfoil cross section, and a plurality of magnets 2010 integrated into a rim 2012 of the rotor 2002.

Figure 21:
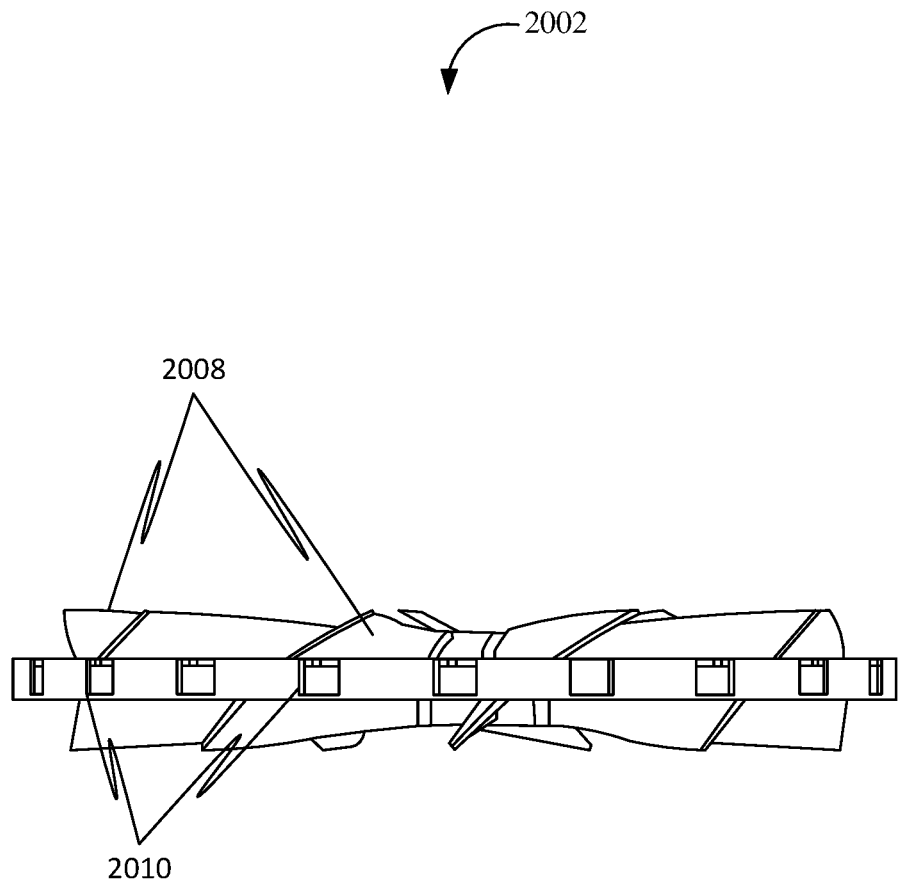
FIG. 21 is a front view of the rotor of the propulsion system, in accordance with some embodiments.

FIG. 21 is a front view of the rotor 2002 of the propulsion system 1202, in accordance with some embodiments.

Figure 22:
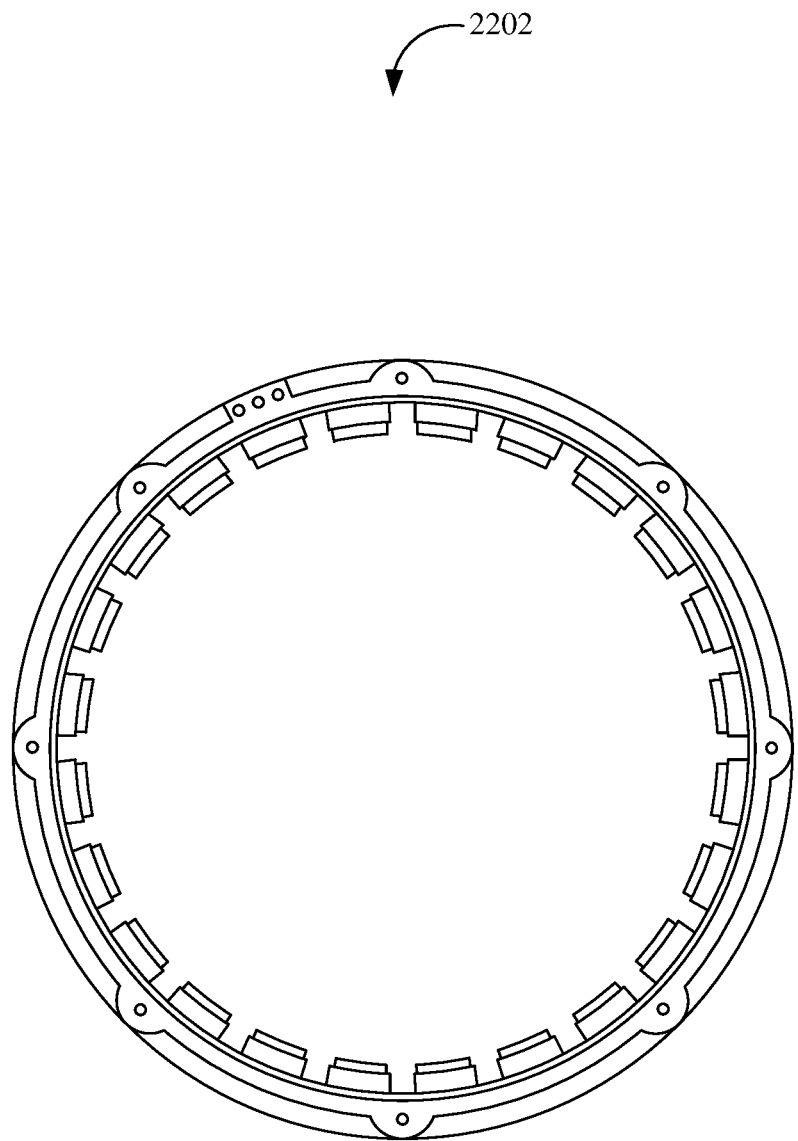
FIG. 22 is a top view of a stator of the propulsion system, in accordance with some embodiments.

FIG. 22 is a top view of a stator 2202 of the propulsion system 1202, in accordance with some embodiments.

Figure 23:
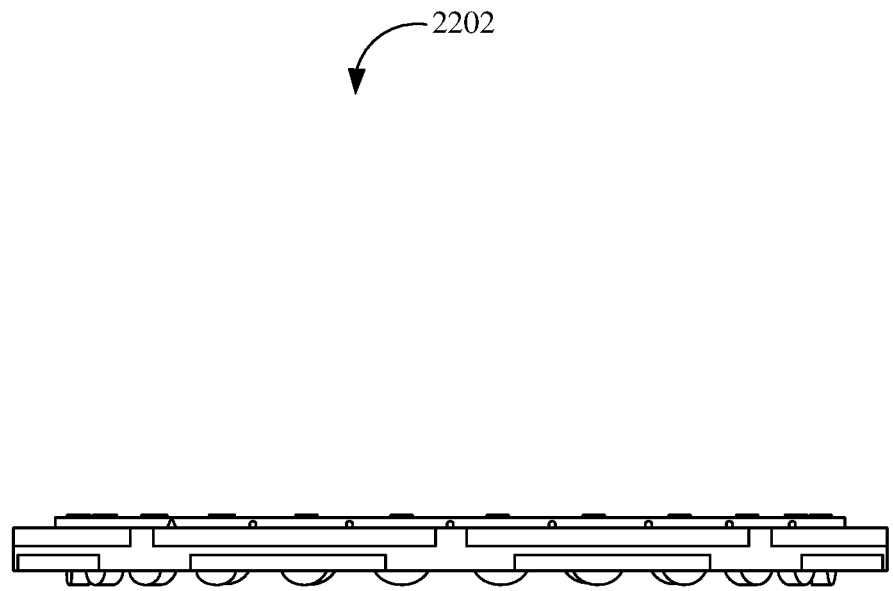
FIG. 23 is a front view of the stator of the propulsion system, in accordance with some embodiments.

FIG. 23 is a front view of the stator 2202 of the propulsion system 1202, in accordance with some embodiments.

Figure 24:
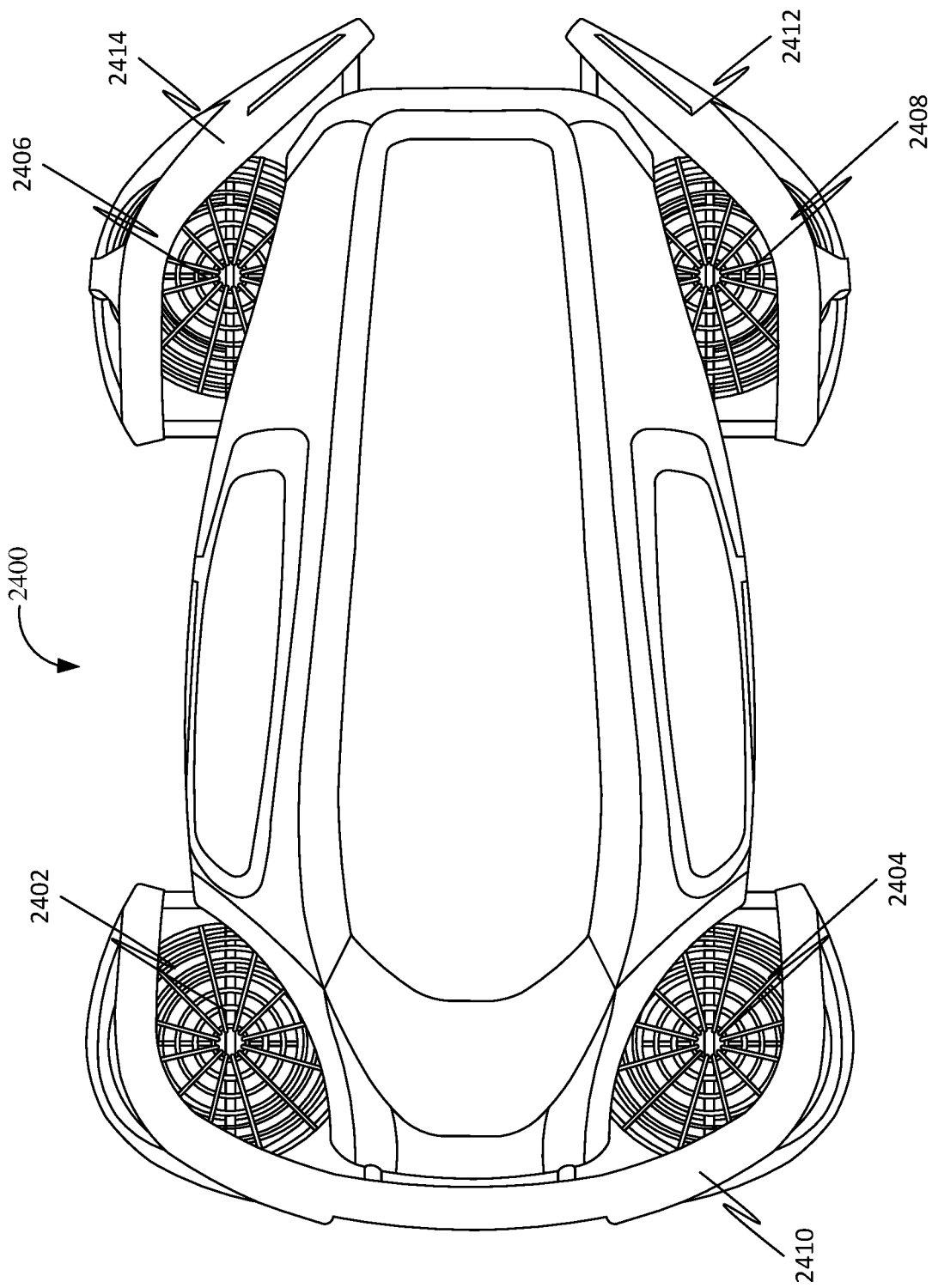
FIG. 24 is a top view of an air vehicle with a plurality of apparatuses for facilitating propulsion of the air vehicle, in accordance with some embodiments.

FIG. 24 is a top view of an air vehicle 2400 with a plurality of apparatuses 2402-2408 for facilitating propulsion of the air vehicle 2400, in accordance with some embodiments. Further, the air vehicle 2400 may include a propulsion bumper 2410-2414.

Figure 25:
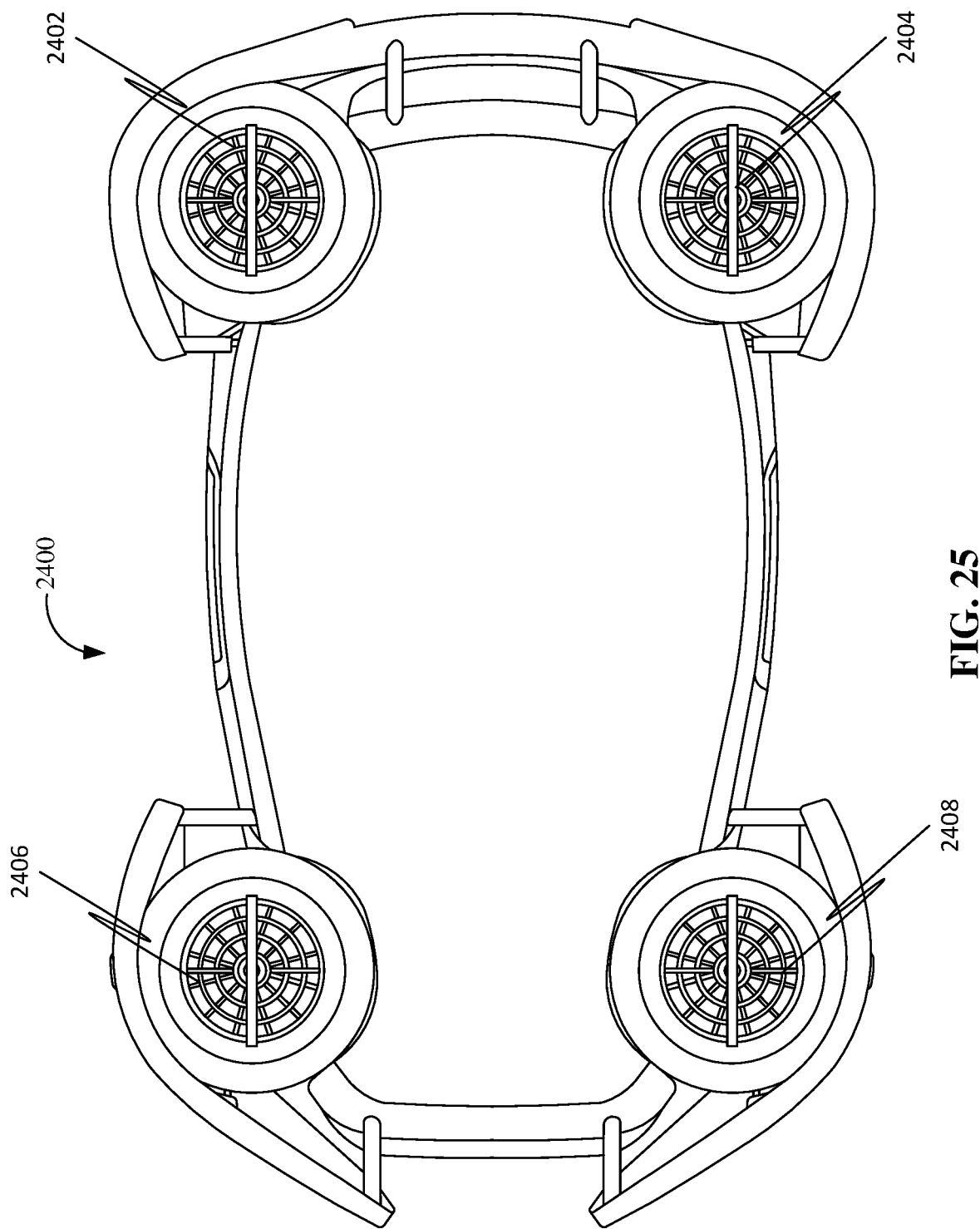
FIG. 25 is a bottom view of the air vehicle with the plurality of apparatuses, in accordance with some embodiments.

FIG. 25 is a bottom view of the air vehicle 2400 with the plurality of apparatuses 2402-2408, in accordance with some embodiments.

Figure 26:
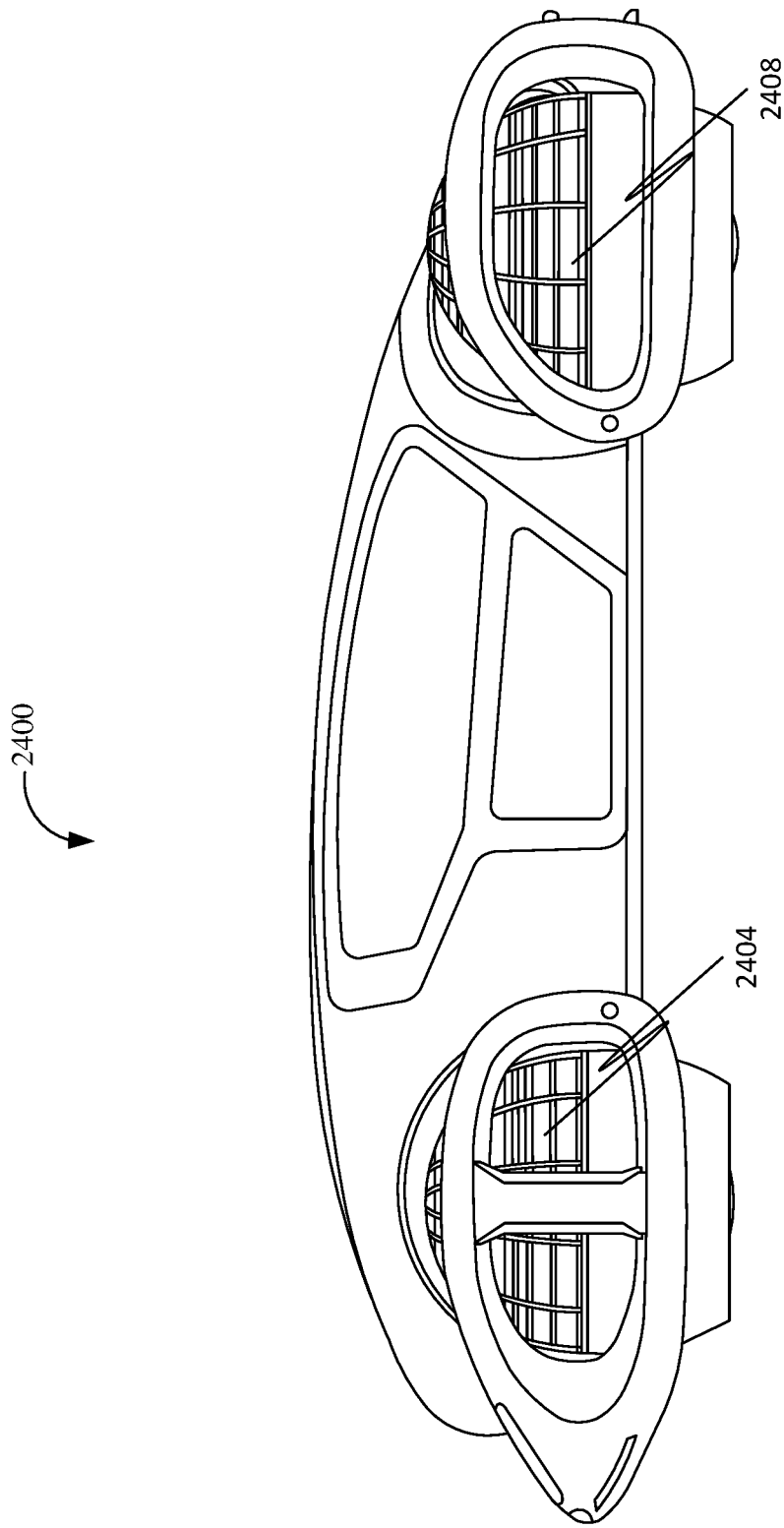
FIG. 26 is a right-side view of the air vehicle with the plurality of apparatuses, in accordance with some embodiments.

FIG. 26 is a right-side view of the air vehicle 2400 with the plurality of apparatuses 2402-2408, in accordance with some embodiments.

Figure 27:
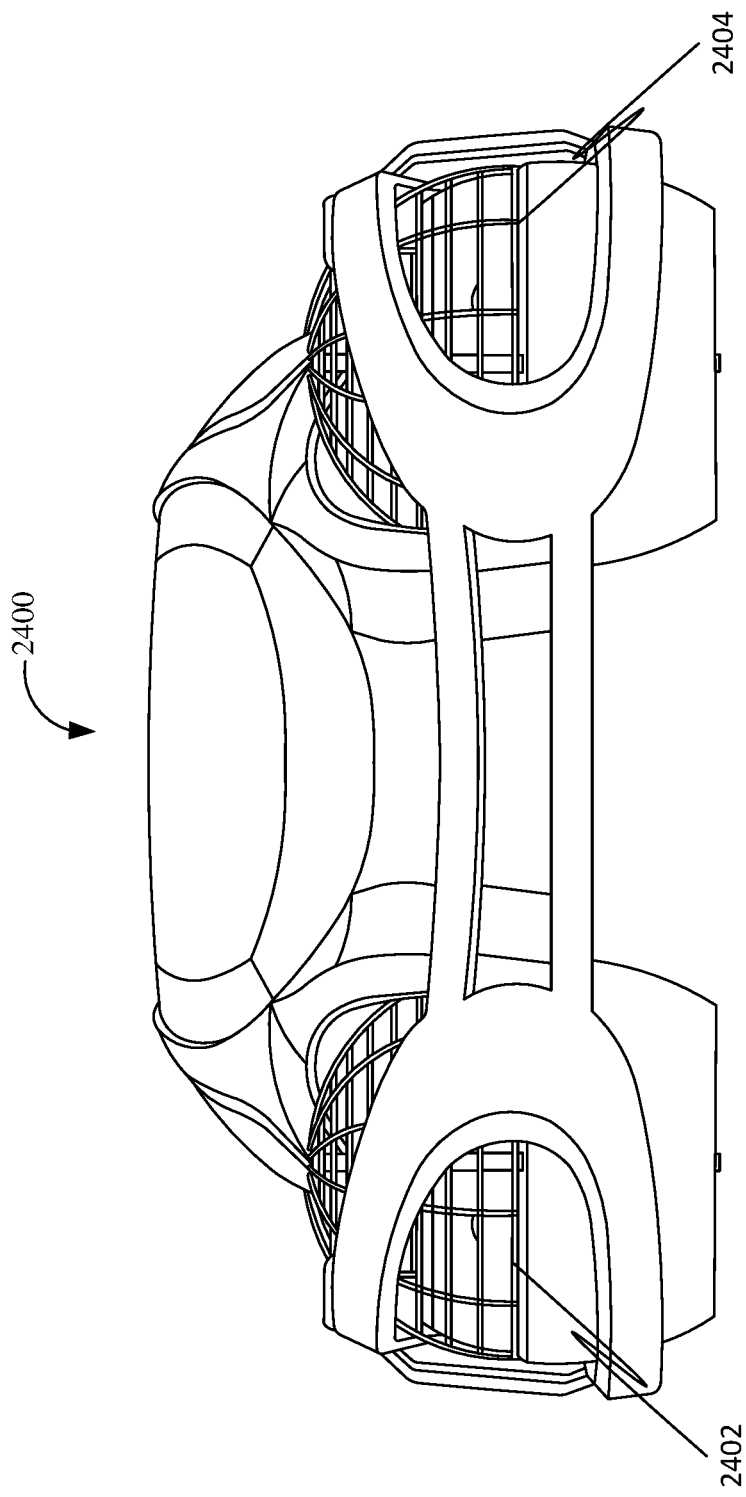
FIG. 27 is a rear view of the air vehicle with the plurality of apparatuses, in accordance with some embodiments.

FIG. 27 is a rear view of the air vehicle 2400 with the plurality of apparatuses 2402-2408, in accordance with some embodiments.

Figure 28:
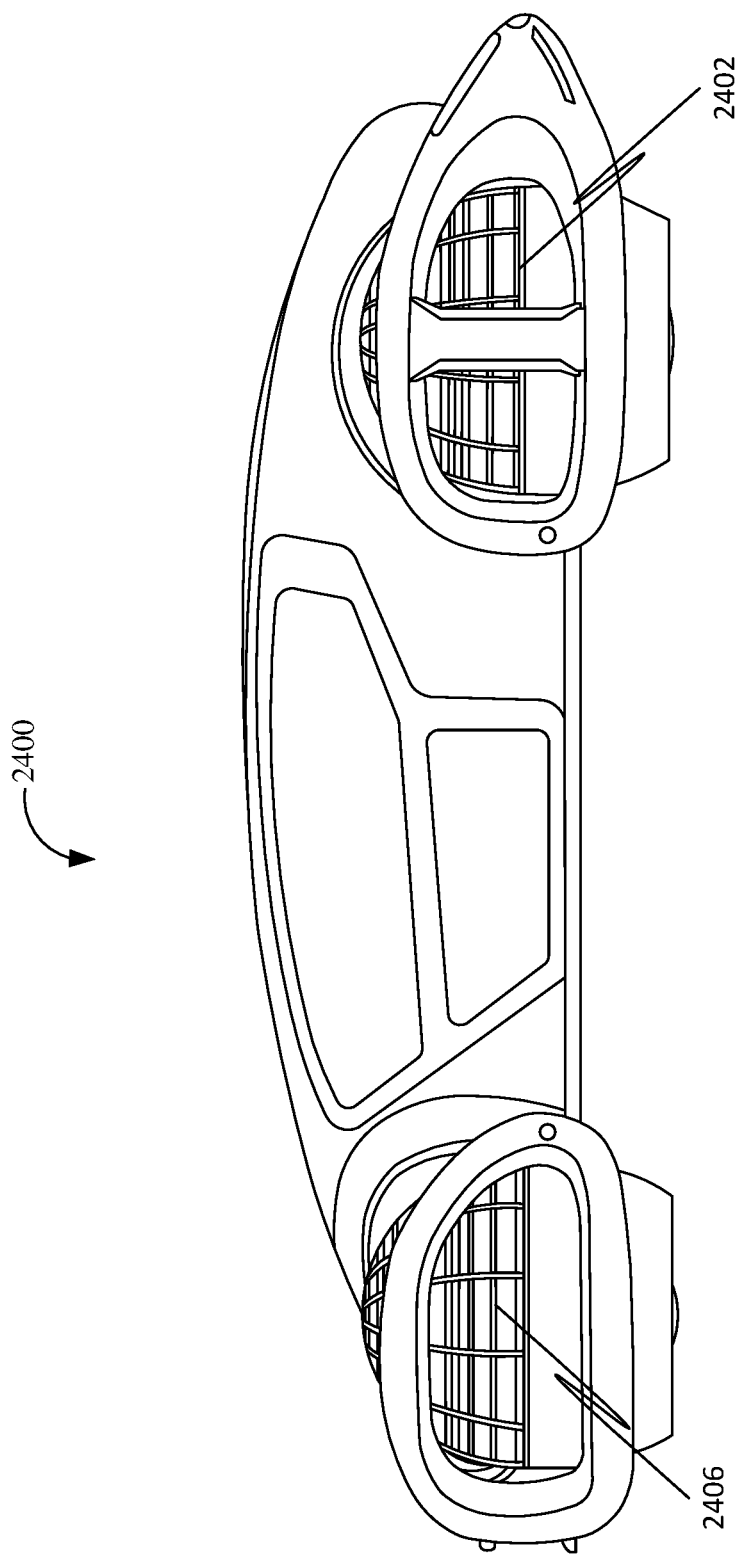
FIG. 28 is a left side view of the air vehicle with the plurality of apparatuses, in accordance with some embodiments.

FIG. 28 is a left side view of the air vehicle 2400 with the plurality of apparatuses 2402-2408, in accordance with some embodiments.

Figure 29:
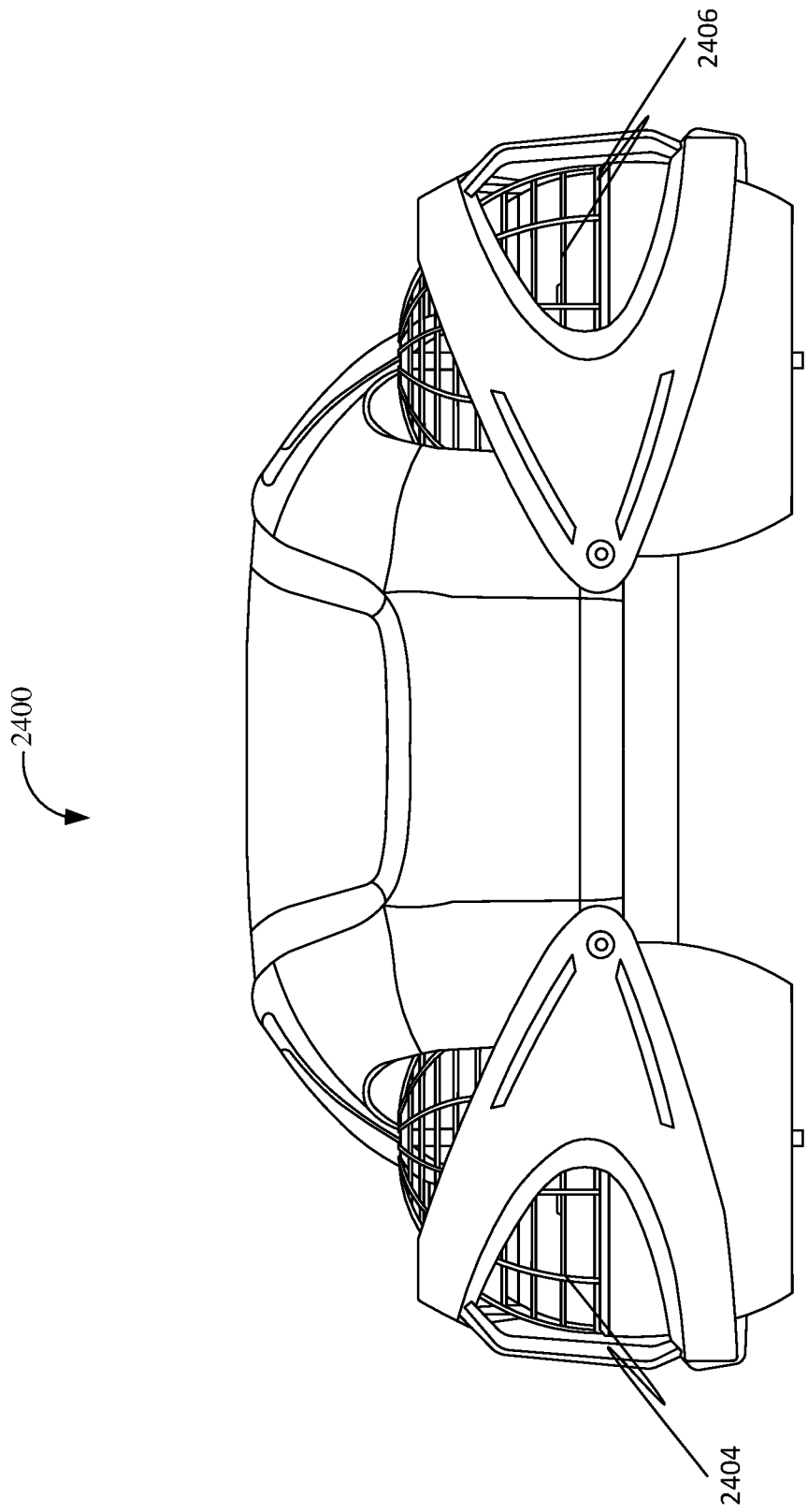
FIG. 29 is a front view of the air vehicle with the plurality of apparatuses, in accordance with some embodiments.

FIG. 29 is a front view of the air vehicle 2400 with the plurality of apparatuses 2402-2408, in accordance with some embodiments.

Figure 30:
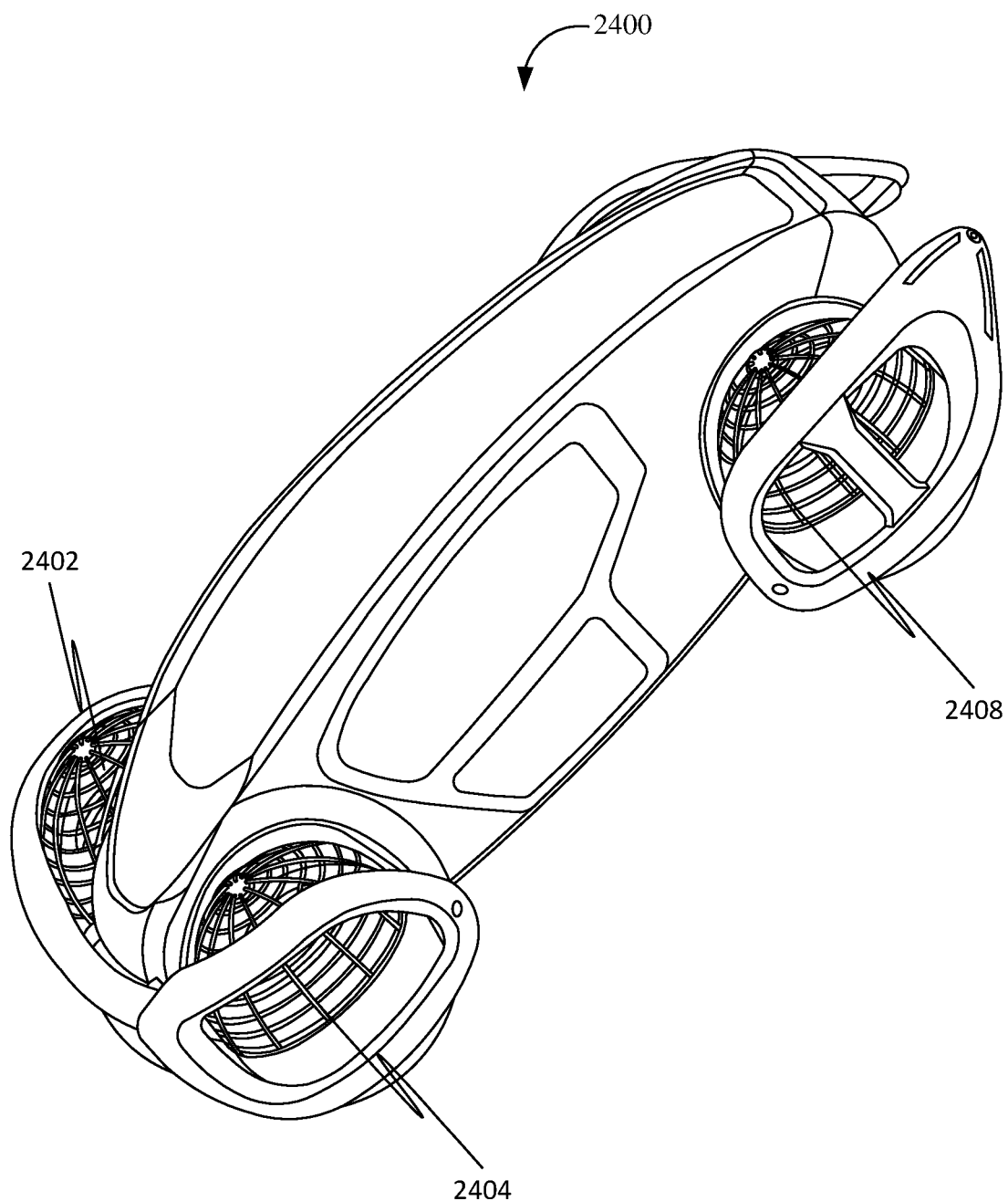
FIG. 30 is a top right-side perspective view of the air vehicle with the plurality of apparatuses, in accordance with some embodiments.

FIG. 30 is a top right-side perspective view of the air vehicle 2400 with the plurality of apparatuses 2402-2408, in accordance with some embodiments.

Figure 31:
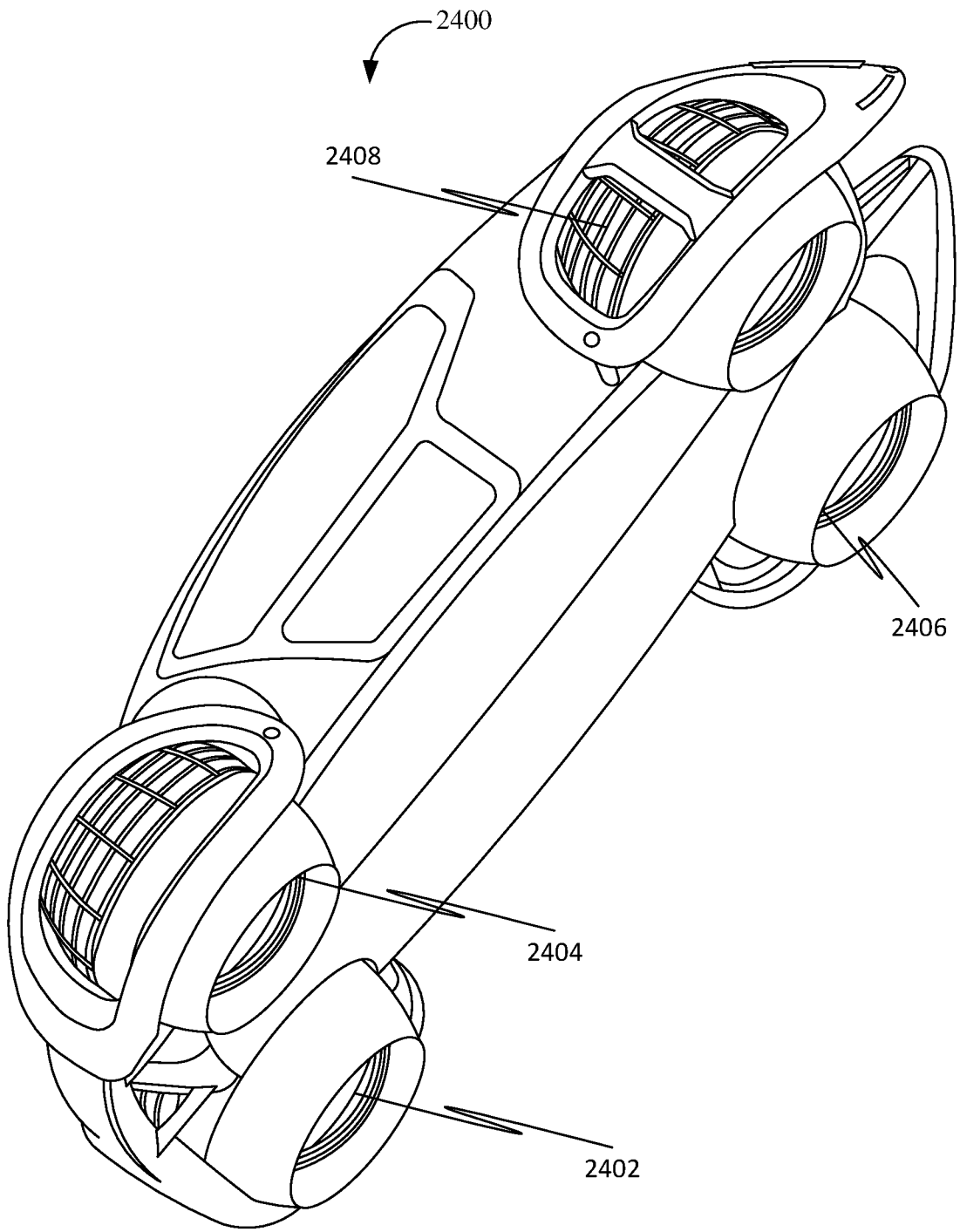
FIG. 31 is a bottom right side perspective view of the air vehicle with the plurality of apparatuses, in accordance with some embodiments.

FIG. 31 is a bottom right side perspective view of the air vehicle 2400 with the plurality of apparatuses 2402-2408, in accordance with some embodiments.

Figure 32:
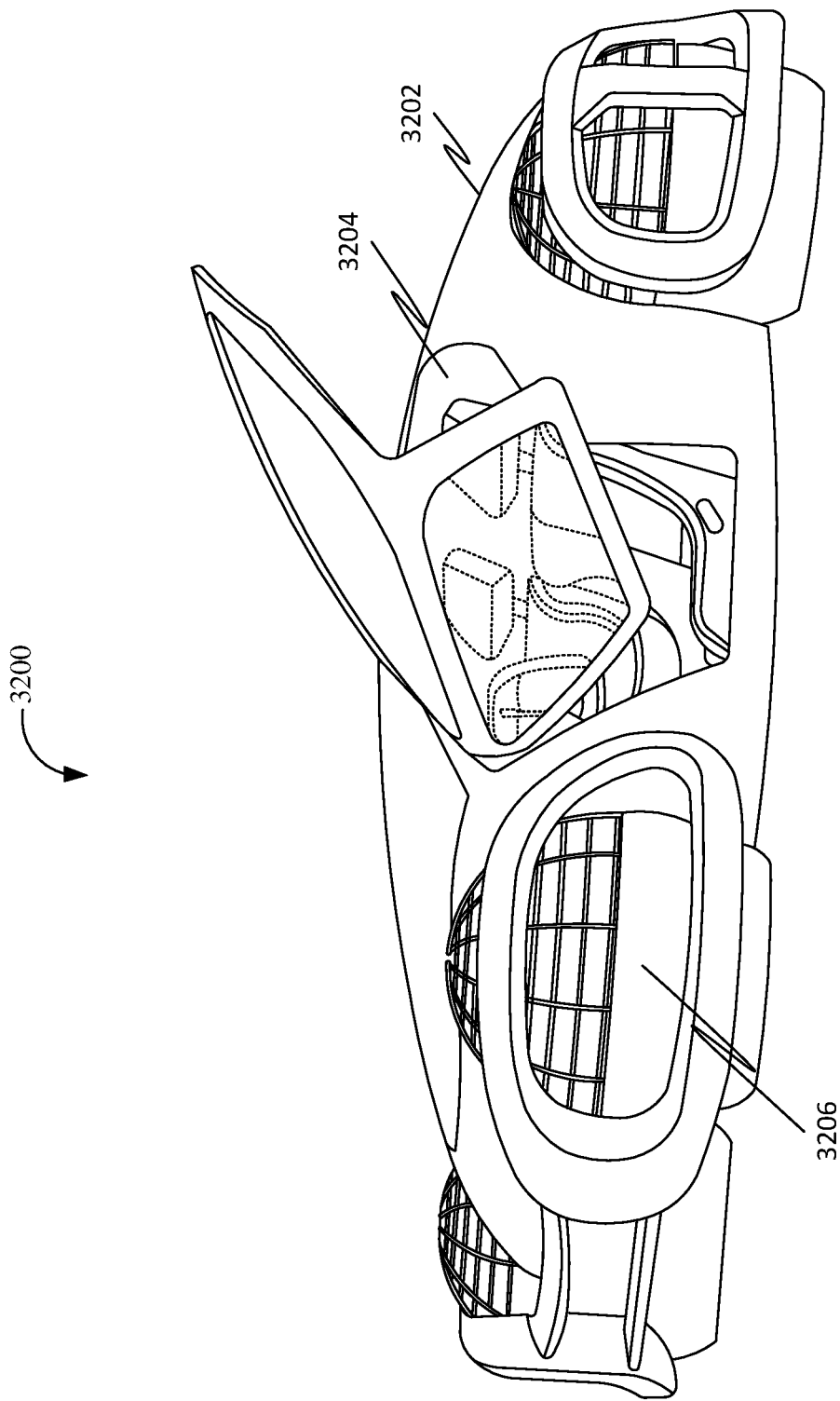
FIG. 32 is a side perspective view of a vehicle with apparatuses for propulsion of the vehicle, in accordance with some embodiments.

FIG. 32 is a side perspective view of a vehicle 3200 with apparatuses 3206 for propulsion of the vehicle 3200, in accordance with some embodiments. Accordingly, the vehicle 3200 may include a vehicle body 3202 and at least one apparatus 3206.

Further, the vehicle body 3202 may be defining a vehicle fuselage 3204.

Further, the at least one apparatus 3206 may be installed in the vehicle 3200. Further, the installing of the at least one apparatus 3206 to the vehicle 3200 may include connecting the at least one apparatus 3206 to the vehicle body 3202. Further, each of the at least one apparatus 3206 may include a housing 3302, a propulsion mechanism 3304, and a gimbal 3306. Further, the housing 3302 may include an interior space 3308, an inlet 3310, and an outlet 3312. Further, the propulsion mechanism 3304 may be disposed in the interior space 3308. Further, the propulsion mechanism 3304 may include a hub 3316 and a spindle 3314 rotatably mounted within the hub 3316. Further, a first portion 3318 of the spindle 3314 extends away from a top side 3322 of the hub 3316 and a second portion of the spindle 3314 extends away from a bottom side 3324 of the hub 3316. Further, the propulsion mechanism 3304 may include an upper rotor 3326 rotatably mounted on the first portion 3318 and a lower rotor 3328 rotatably mounted on the second portion 3320. Further, the upper rotor 3326 may be configured to be rotated about a central axis of the spindle 3314 in a first direction using an upper stator 3330 and the lower rotor 3328 may be configured to be rotated about the central axis of the spindle 3314 in a second direction opposite to the first direction using a lower stator 3332. Further, the upper rotor 3326 may include a plurality of upper rotor blades with a first blade pitch and the lower rotor 3328 may include a plurality of lower rotor blades with a second blade pitch opposite to the first blade pitch. Further, the rotating of the upper rotor 3326 in the first direction and the lower rotor 3328 in the second direction creates a fluid flow from the inlet 3310 to the outlet 3312 for generating a directional thrust. Further, the generating of the directional thrust facilitates the propulsion of the vehicle 3200. Further, the gimbal 3306 may be disposed in the interior space 3308. Further, the gimbal 3306 may be configured for rotatably attaching the propulsion mechanism 3304 to the housing 3302. Further, the housing 3302 may be rotatable in relation to the propulsion mechanism 3304 for vectoring the directional thrust based on the rotatably attaching. Further, the generating of the directional thrust and the vectoring of the directional thrust facilitates at least one propelling action associated with the propulsion of the vehicle 3200.

Further, in some embodiments, the upper rotor 3326 may include an upper rotor hub and an upper rim disposed around the upper rotor hub. Further, the plurality of upper rotor blades radially extends from the upper rotor hub to an inner surface of the upper rim. Further, the lower rotor 3328 may include a lower rotor hub and a lower rim disposed around the lower rotor hub. Further, the plurality of lower rotor blades radially extends from the lower rotor hub to an inner surface of the lower rim.

Further, in an embodiment, the upper rim may include a plurality of upper rim magnets integrated into an outer surface of the upper rim and the lower rim may include a plurality of lower rim magnets integrated into an outer surface of the lower rim. Further, the upper stator 3330 may be disposed around the upper rotor 3326 and the lower stator 3332 may be disposed around the lower rotor 3328. Further, the upper stator 3330 may include a plurality of upper stator coils corresponding to the plurality of upper rim magnets and the lower stator 3332 may include a plurality of lower stator coils corresponding to the plurality of lower rim magnets. Further, the plurality of upper stator coils and the plurality of lower stator coils may be energized for the rotating of the upper rotor 3326 in the first direction and the lower rotor 3328 in the second direction.

In an embodiment, each of the at least one apparatus 3206 may include a controller. Further, the controller may be coupled with at least one of the plurality of upper stator coils and the plurality of lower stator coils. Further, the controller may be configured for controlling the energizing of at least one of the plurality of upper stator coils and the plurality of lower stator coils based on at least one first input received by the controller.

Further, in an embodiment, the controller may be coupled to a rotating mechanism associated with the housing 3302. Further, the rotating mechanism rotates the housing 3302 for the vectoring of the directional thrust. Further, the controller may be configured for controlling the rotating of the housing 3302 based on at least one second input received by the controller.

Further, in some embodiments, a cross-section of each of the plurality of upper rotor blades and each of the plurality of lower rotor blades may be an airfoil cross-section. Further, the creating of the fluid flow from the inlet 3310 to the outlet 3312 may be based on the airfoil cross-section of each of the plurality of upper rotor blades and each of the plurality of lower rotor blades.

Figure 33:
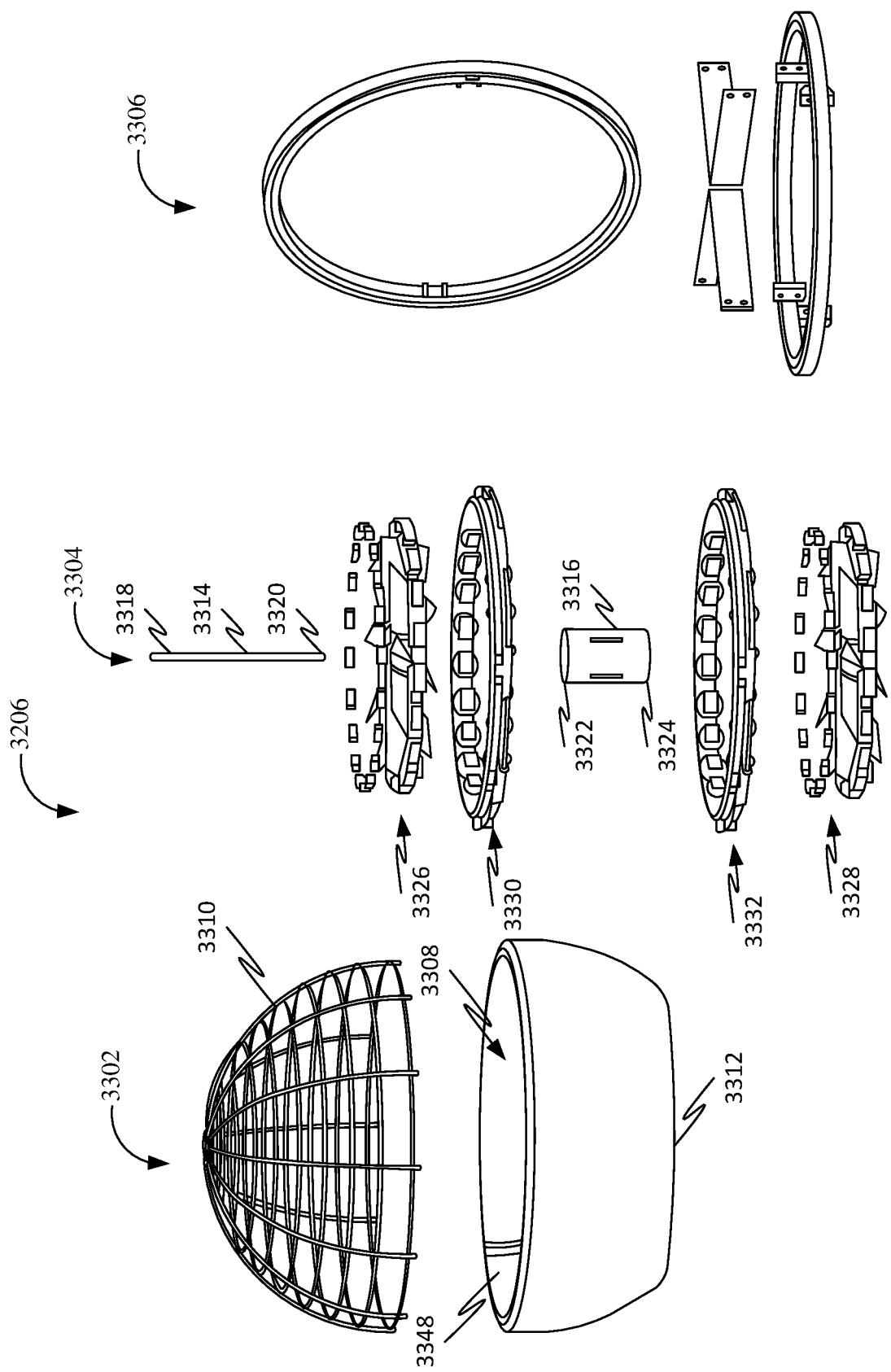
FIG. 33 is a disassembled view of the apparatuses, in accordance with some embodiments.

FIG. 33 is a disassembled view of the apparatuses 3206, in accordance with some embodiments.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

According to some aspects, a personal air vehicle powered by multi spherical reflexive inertia propulsion systems is disclosed. Accordingly, the personal air vehicle may include a fuselage having a longitudinal axis configured for accommodating at least one passenger and a cockpit, wherein the fuselage comprises an outer structure comprising an internal space associated with the at least one passenger and the cockpit. Further, the personal air vehicle may include the cockpit comprising a flight computer configured for facilitating controlling flight of the personal air vehicle using a fly-by-wire system. Further, the cockpit may include a vehicle steering mechanism configured for steering the personal air vehicle. Further, the personal air vehicle may include a plurality of reflexive inertia propulsion mechanisms fixedly attached to the fuselage. Further, the plurality of reflexive inertia propulsion mechanisms may be configured for generating thrust for facilitating takeoff and landing of the personal air vehicle. Further, each reflexive inertia propulsion mechanism of the plurality of reflexive inertia propulsion mechanisms two counter-rotating flywheels integrated with magnetic rings, a motor case housing comprising two stators with field coils that force the magnetic rings of each of the two counter-rotating flywheels to rotate in opposite directions, a gimbal comprising a horizontal thrust bearing and a vertical thrust bearing, a lower sphere attached to an outer ring of the horizontal thrust bearing and an outer ring of the vertical thrust bearing, a flexible nozzle connecting a lower inner duct housing with a lower hemisphere, and an upper shield hemisphere rigidly mounted to the lower hemisphere to protect from the immediate surrounding of the plurality of reflexive propulsion mechanisms. Further, the personal air vehicle may include a peripheral propulsion mechanism attached to the fuselage. Further, the peripheral propulsion mechanism may be configured for facilitating directional control of the personal air vehicle. Further, the personal air vehicle may include a power source configured for powering at least one of the peripheral propulsion mechanism, the plurality of reflexive inertia propulsion mechanisms, and the flight computer.

Although the present disclosure has been explained in relation to its preferred embodiment, it is to be understood that many other possible modifications and variations can be made without departing from the spirit and scope of the disclosure.

What is claimed is:

1. An apparatus for facilitating propulsion of a vehicle, the apparatus comprising:
 a housing comprising an interior space, an inlet, and an outlet;
 a propulsion mechanism disposed in the interior space, wherein the propulsion mechanism comprises a hub and a spindle rotatably mounted within the hub, wherein a first portion of the spindle extends away from a top side of the hub and a second portion of the spindle extends away from a bottom side of the hub, wherein the propulsion mechanism comprises an upper rotor rotatably mounted on the first portion and a lower rotor rotatably mounted on the second portion, wherein the upper rotor is configured to be rotated about a central axis of the spindle in a first direction using an upper stator and the lower rotor is configured to be rotated about the central axis of the spindle in a second direction opposite to the first direction using a lower stator, wherein the upper rotor comprises a plurality of upper rotor blades with a first blade pitch and the lower rotor comprises a plurality of lower rotor blades with a second blade pitch opposite to the first blade pitch, wherein the rotating of the upper rotor in the first direction and the lower rotor in the second direction creates a fluid flow from the inlet to the outlet for generating a directional thrust, wherein the generating of the directional thrust facilitates the propulsion of the vehicle; and a gimbal disposed in the interior space, wherein the gimbal is configured for rotatably attaching the propulsion mechanism to the housing, wherein the housing is rotatable in relation to the propulsion mechanism for vectoring the directional thrust based on the rotatably attaching, wherein the generating of the directional thrust and the vectoring of the directional thrust facilitates at least one propelling action associated with the propulsion of the vehicle.

2. The apparatus of claim 1, wherein the upper rotor comprises an upper rotor hub and an upper rim disposed around the upper rotor hub, wherein the plurality of upper rotor blades radially extends from the upper rotor hub to an inner surface of the upper rim, wherein the lower rotor comprises a lower rotor hub and a lower rim disposed around the lower rotor hub, wherein the plurality of lower rotor blades radially extends from the lower rotor hub to an inner surface of the lower rim.

3. The apparatus of claim 2, wherein the upper rim comprises a plurality of upper rim magnets integrated into an outer surface of the upper rim and the lower rim comprises a plurality of lower rim magnets integrated into an outer surface of the lower rim, wherein the upper stator is disposed around the upper rotor and the lower stator is disposed around the lower rotor, wherein the upper stator comprises a plurality of upper stator coils corresponding to the plurality of upper rim magnets and the lower stator comprises a plurality of lower stator coils corresponding to the plurality of lower rim magnets, wherein the plurality of upper stator coils and the plurality of lower stator coils are energized for the rotating of the upper rotor in the first direction and the lower rotor in the second direction.

4. The apparatus of claim 3 further comprising a controller coupled with at least one of the plurality of upper stator coils and the plurality of lower stator coils, wherein the controller is configured for controlling the energizing of at least one of the plurality of upper stator coils and the plurality of lower stator coils based on at least one first input received by the controller.

5. The apparatus of claim 4 further comprising:
at least one of an external sensor and an internal sensor, wherein at least one of the external sensor and the internal sensor is configured for generating at least one sensor data based on detecting at least one of an internal characteristic and an external characteristic associated with the apparatus;
a processing device communicatively coupled with at least one of the external sensor and the internal sensor, wherein the processing device is configured for:
analyzing the at least one sensor data;
determining at least one energizing condition for the energizing based on the analyzing; and
generating the at least one first input for the controller based on the determining; and
a communication device communicatively coupled with the processing device, wherein the communication device is configured for transmitting the at least one first input to the controller.

6. The apparatus of claim 5, wherein the controller is coupled to a rotating mechanism associated with the housing, wherein the rotating mechanism rotates the housing for the vectoring of the directional thrust, wherein the controller is configured for controlling the rotating of the housing based on at least one second input received by the controller.

7. The apparatus of claim 6, wherein the processing device is further configured for:
determining a position of the housing from a plurality of positions of the housing in relation to the propulsion mechanism based on the analyzing; and
generating the at least one second input based on the determining of the position, wherein the communication device is further configured for transmitting the at least one second input to the controller.

8. The apparatus of claim 1, wherein a cross-section of each of the plurality of upper rotor blades and each of the plurality of lower rotor blades is an airfoil cross-section, wherein the creating of the fluid flow from the inlet to the outlet is based on the airfoil cross-section of each of the plurality of upper rotor blades and each of the plurality of lower rotor blades.

9. The apparatus of claim 1, wherein the gimbal comprises a first roller bearing and a second roller bearing, wherein the first roller bearing is disposed around the propulsion mechanism, wherein a first central axis of the first roller bearing is parallel to the central axis of the spindle, wherein a first inner ring of the first roller bearing is coaxially attached to the hub using at least one cross member, wherein the second roller bearing is disposed around the first roller bearing, wherein a second central axis of the second roller bearing is perpendicular to the first central axis, wherein a second inner ring of the second roller bearing is perpendicularly attached to a first outer ring of the first roller bearing, wherein a second outer ring of the second roller bearing is attached to an inner surface of the housing, wherein the first inner ring is rotatable in relation to the first outer ring and the second inner ring is rotatable in relation to the second outer ring.

10. The apparatus of claim 1, wherein the propulsion mechanism further comprises an upper motor case and a lower motor case, wherein a first end of the upper motor case is attached to a first end of the lower motor case forming a motor case interior space, wherein the upper motor case houses the upper stator and the upper rotor and the lower motor case houses the lower stator and the lower rotor, wherein the hub is disposed in the motor case interior space.

11. The apparatus of claim 10, wherein the propulsion system further comprises a top gimbal housing and a bottom gimbal housing, wherein the top gimbal housing comprises a top opening disposed on a first housing end of the top gimbal housing and the bottom gimbal housing comprises a bottom opening disposed on a first housing end of the bottom gimbal housing, wherein the top gimbal housing houses the upper motor case and the bottom gimbal housing houses the lower motor case, wherein a second housing end of the top gimbal housing is attached to a second housing end of the bottom gimbal housing defining a duct from the top opening to the bottom opening through the motor case interior space, wherein the fluid flow is created in the duct.

12. The apparatus of claim 11 further comprising a flexible nozzle configured for connecting the bottom opening to the outlet of the housing, wherein a first end of the flexible nozzle is circumferentially attached to the first housing end of the bottom gimbal housing around the bottom opening and a second end of the flexible nozzle is attached to the housing around the outlet.

13. The apparatus of claim 1, wherein the apparatus is configured to be installed in the vehicle.

14. The apparatus of claim 13, wherein the vehicle comprises a vehicle body defining a vehicle fuselage, wherein the installing of the apparatus to the vehicle comprises connecting the apparatus to the vehicle body.

15. A vehicle with apparatuses for propulsion of the vehicle, the vehicle comprising:
a vehicle body defining a vehicle fuselage; and
at least one apparatus installed in the vehicle, wherein the installing of the at least one apparatus to the vehicle comprises connecting the at least one apparatus to the vehicle body, wherein each of the at least one apparatus comprises:
a housing comprising an interior space, an inlet, and an outlet;
a propulsion mechanism disposed in the interior space, wherein the propulsion mechanism comprises a hub and a spindle rotatably mounted within the hub, wherein a first portion of the spindle extends away from a top side of the hub and a second portion of the spindle extends away from a bottom side of the hub, wherein the propulsion mechanism comprises an upper rotor rotatably mounted on the first portion and a lower rotor rotatably mounted on the second portion, wherein the upper rotor is configured to be rotated about a central axis of the spindle in a first direction using an upper stator and the lower rotor is configured to be rotated about the central axis of the spindle in a second direction opposite to the first direction using a lower stator, wherein the upper rotor comprises a plurality of upper rotor blades with a first blade pitch and the lower rotor comprises a plurality of lower rotor blades with a second blade pitch opposite to the first blade pitch, wherein the rotating of the upper rotor in the first direction and the lower rotor in the second direction creates a fluid flow from the inlet to the outlet for generating a directional thrust, wherein the generating of the directional thrust facilitates the propulsion of the vehicle; and
a gimbal disposed in the interior space, wherein the gimbal is configured for rotatably attaching the propulsion mechanism to the housing, wherein the housing is rotatable in relation to the propulsion mechanism for vectoring the directional thrust based on the rotatably attaching, wherein the generating of the directional thrust and the vectoring of the directional thrust facilitates at least one propelling action associated with the propulsion of the vehicle.

16. The vehicle of claim 15, wherein the upper rotor comprises an upper rotor hub and an upper rim disposed around the upper rotor hub, wherein the plurality of upper rotor blades radially extends from the upper rotor hub to an inner surface of the upper rim, wherein the lower rotor comprises a lower rotor hub and a lower rim disposed around the lower rotor hub, wherein the plurality of lower rotor blades radially extends from the lower rotor hub to an inner surface of the lower rim.

17. The vehicle of claim 16, wherein the upper rim comprises a plurality of upper rim magnets integrated into an outer surface of the upper rim and the lower rim comprises a plurality of lower rim magnets integrated into an outer surface of the lower rim, wherein the upper stator is disposed around the upper rotor and the lower stator is disposed around the lower rotor, wherein the upper stator comprises a plurality of upper stator coils corresponding to the plurality of upper rim magnets and the lower stator comprises a plurality of lower stator coils corresponding to the plurality of lower rim magnets, wherein the plurality of upper stator coils and the plurality of lower stator coils are energized for the rotating of the upper rotor in the first direction and the lower rotor in the second direction.

18. The vehicle of claim 17 further comprising a controller coupled with at least one of the plurality of upper stator coils and the plurality of lower stator coils, wherein the controller is configured for controlling the energizing of at least one of the plurality of upper stator coils and the plurality of lower stator coils based on at least one first input received by the controller.

19. The vehicle of claim 18, wherein the controller is coupled to a rotating mechanism associated with the housing, wherein the rotating mechanism rotates the housing for the vectoring of the directional thrust, wherein the controller is configured for controlling the rotating of the housing based on at least one second input received by the controller.

20. The vehicle of claim 15, wherein a cross-section of each of the plurality of upper rotor blades and each of the plurality of lower rotor blades is an airfoil cross-section, wherein the creating of the fluid flow from the inlet to the outlet is based on the airfoil cross-section of each of the plurality of upper rotor blades and each of the plurality of lower rotor blades.

* * * * *